US012320887B2

(12) United States Patent
Arbabian et al.

(10) Patent No.: US 12,320,887 B2
(45) Date of Patent: Jun. 3, 2025

(54) SPATIAL SENSOR SYSTEM WITH BACKGROUND SCENE SUBTRACTION

(71) Applicant: Plato Systems, Inc., San Carlos, CA (US)

(72) Inventors: Mohammad Amin Arbabian, San Francisco, CA (US); Alex Gilbert, Los Gatos, CA (US); Hao Nan, San Mateo, CA (US); Mashhour Solh, San Jose, CA (US)

(73) Assignee: Plato Systems, Inc., San Carlos, CA (US)

( * ) Notice: Subject to any disclaimer, the term of this patent is extended or adjusted under 35 U.S.C. 154(b) by 716 days.

(21) Appl. No.: 17/383,054

(22) Filed: Jul. 22, 2021

(65) Prior Publication Data

US 2022/0026557 A1   Jan. 27, 2022

Related U.S. Application Data

(60) Provisional application No. 62/705,912, filed on Jul. 22, 2020.

(51) Int. Cl.
  *G01S 13/58* (2006.01)
  *G01S 7/35* (2006.01)
  *G01S 13/66* (2006.01)

(52) U.S. Cl.
  CPC .......... *G01S 13/582* (2013.01); *G01S 7/354* (2013.01); *G01S 13/66* (2013.01)

(58) Field of Classification Search
  None
  See application file for complete search history.

(56) References Cited

U.S. PATENT DOCUMENTS

| 7,492,303 | B1* | 2/2009 | Levitan | G01S 7/024 |
| | | | | 342/188 |
| 9,582,933 | B1* | 2/2017 | Mosterman | G06T 19/00 |
| 9,599,702 | B1* | 3/2017 | Bordes | G01S 13/18 |
| 10,451,712 | B1* | 10/2019 | Madhow | G01S 13/723 |
| 10,609,148 | B1* | 3/2020 | Tran | G06Q 50/40 |
| 11,032,022 | B1* | 6/2021 | Sen | H04W 12/122 |
| 2016/0355192 | A1* | 12/2016 | James | B60W 50/16 |

(Continued)

FOREIGN PATENT DOCUMENTS

JP   5625445 B2 * 11/2014

OTHER PUBLICATIONS

Melvin, William L.; Scheer, James A.; Principles of Modern Radar—vol. III: Radar Applications, 2014, SciTech Publishing, pp. 352-357, 383-390.*

(Continued)

*Primary Examiner* — Vladimir Magloire
*Assistant Examiner* — David C. Schultz
(74) *Attorney, Agent, or Firm* — Schwegman, Lundberg & Woessner, P.A.

(57) ABSTRACT

A system is provided that learns a radar scene's background and that filters radar tracks determined to be in the radar scene background; The system including processing circuitry configured with executable instructions to accesses radar tracks that include radar measurements; to use the measurements to determine a persistent radar object in a radar scene background; and to subsequently filter accessed radar tracks having locations within the radar scene background.

12 Claims, 30 Drawing Sheets

(56) References Cited

U.S. PATENT DOCUMENTS

| | | | |
|---|---|---|---|
| 2017/0206436 A1* | 7/2017 | Schiffmann | G01S 13/931 |
| 2017/0242117 A1* | 8/2017 | Izzat | G01S 17/66 |
| 2018/0372861 A1* | 12/2018 | Degani | G01S 13/42 |
| 2019/0120955 A1* | 4/2019 | Zhong | G01S 13/931 |
| 2019/0162838 A1* | 5/2019 | Luu | G01S 13/5246 |
| 2020/0124706 A1* | 4/2020 | Buddendick | G01S 13/584 |
| 2020/0174112 A1* | 6/2020 | Xing | G01S 7/41 |
| 2020/0175315 A1* | 6/2020 | Gowaikar | G01S 13/867 |

OTHER PUBLICATIONS

Hsu, Y.-W.; Lai, Y.-H.; Zhong, K.-Q.; Yin, T.-K.; Perng, J.-W., "Developing an On-Road Object Detection System Using Monovision and Radar Fusion," Dec. 2019, Energies 2020, 13, 116, pp. 3-5.*

Skolnik, Merrill; Radar Handbook, Third Edition, 2008, McGraw-Hill, p. 2.7.*

Hsu, Y.-W.; Lai, Y.-H.; Zhong, K.-Q.; Yin, T.-K.; Perng, J.-W., "Developing an On-Road Object Detection System Using Monovision and Radar Fusion," Dec. 2019, Energies 2020, 13, 116, pp. 3-5 (Year: 2019).*

* cited by examiner

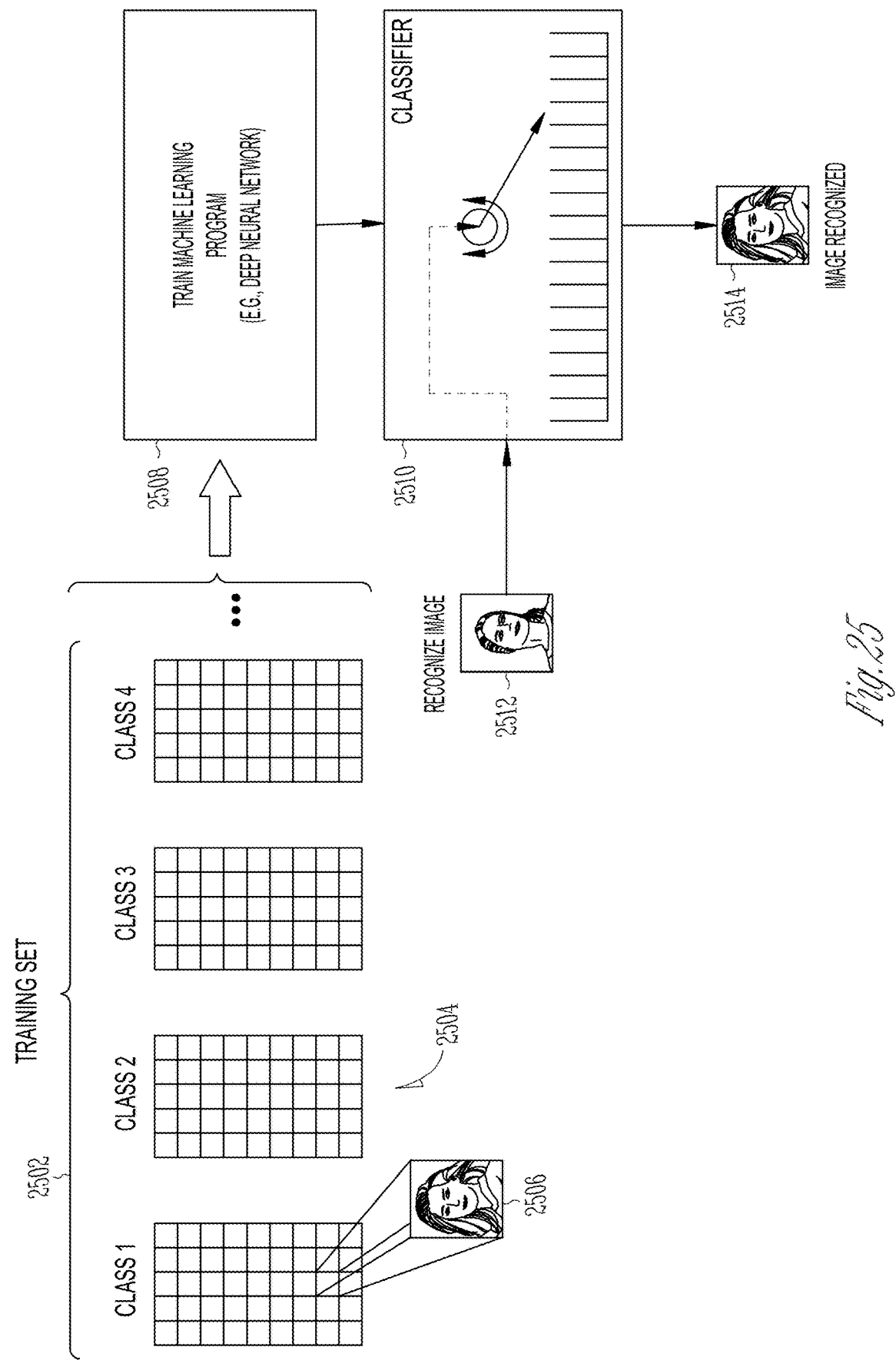

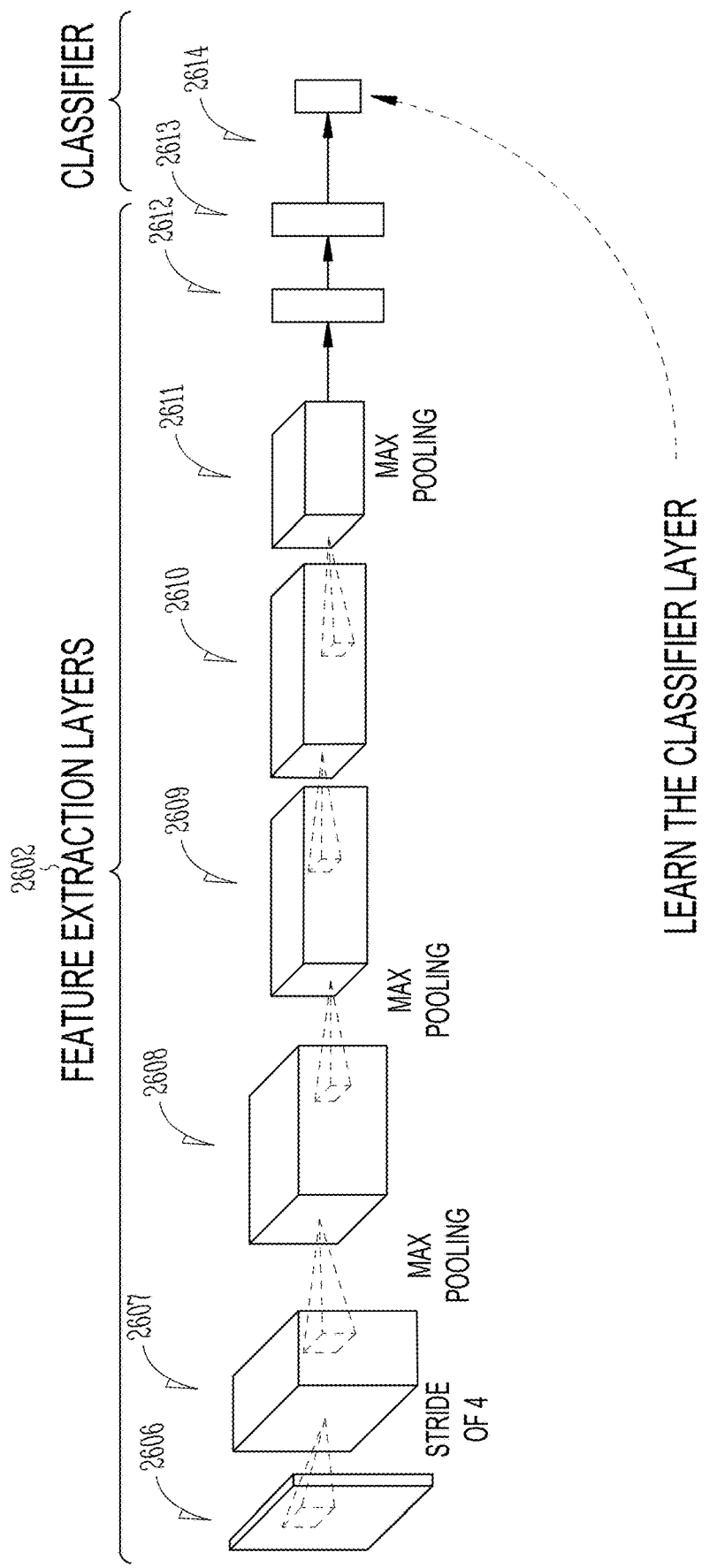

SPATIAL SENSOR SYSTEM WITH BACKGROUND SCENE SUBTRACTION

CROSS REFERENCE TO RELATED APPLICATION

This application claims priority to U.S. provisional application Ser. No. 62/705,912, filed Jul. 22, 2020, entitled Background Understanding and Subtraction for Multi Sensor Fusion, which is incorporated herein in its entirety by this reference.

BACKGROUND

Cameras have been used as sensors in a spatial intelligence system to monitor and track motion and activity of foreground objects such as people, animals, vehicles, etc. In the past, one way to monitor a spatial scene was through eyeballing the video footage. However, more recently, advances in computer vision and machine learning have made it possible to automatically detect and track foreground objects, captured in video live stream or footage, through a classical or deep neural network detectors and classifiers. The performance of these detectors and classifiers has been limited by several factors such as low visibility at night, foreground objects at far range and weather conditions such as fog, rain, snow and others. One way to solve these problems is to replace camera(s) with other kinds of sensors that are not affected by illumination, range, or weather conditions or use a combination of such sensors and cameras. An example of such sensors is microwave/mmwave radar. One of the main challenges of single and multi-sensor detection and classification systems is background noise. Objects in the background (such as trees, fences, poles, flags) can often move or shake, confusing detection and classification and causing false alarms or false detections, especially for sensors that are sensitive to motion.

SUMMARY

The present disclosure generally relates to machines configured to process radar data, including computerized variants of such special-purpose machines and improvements to such variants, and to the technologies by which such special-purpose machines become improved compared to other special-purpose machines that provide technology for processing radar data. In particular, the present disclosure addresses systems and methods for determining and using background estimates of radar scenes and for determining and using foreground activity patterns in radar scenes to improve performance of spatial sensors that include radar.

According to some aspects of the technology described herein, a system includes processing circuitry and memory. The processing circuitry accesses radar tracks, each radar track comprising one or more Doppler measurements, one or more range measurements, and one or more angle measurements. The processing circuitry determines a persistent radar object at a radar background location within the radar scene, based upon one or more of the accessed radar tracks having the background location. The processing circuitry filters a first accessed first radar track having a location within the radar scene corresponding to the determined background location.

According to other aspects of the technology described herein, a system includes processing circuitry and memory. The processing circuitry detects track paths for a plurality of radar tracks. The processing circuitry determines one or more radar foreground activity patterns, based at least in part upon the detected track paths. The processing circuitry produces an alert signal, based upon at least one second accessed radar track and a determined radar foreground activity pattern.

According to still further aspects of the technology described herein, a system includes processing circuitry and memory. The processing circuitry accesses radar tracks, each radar track comprising one or more Doppler measurements, one or more range measurements, and one or more angle measurements. The processing circuitry accesses vision data from one or more computer vision devices, the vision data from the one or more computer vision devices comprising two-dimensional (2D) images of the vision scene. The processing circuitry determines a radar background based upon the accessed radar tracks. The processing circuitry determines an image background based upon the accessed 2D images. The processing circuitry accesses a first accessed radar track at a first radar scene location. The processing circuitry accessing a first image region of interest (ROI) at a first vision scene location. The processing circuitry filters the first accessed radar track based at least in part upon whether a first radar scene location of the first accessed radar track is within the radar background and whether a first vision scene location of the first image region of interest (ROI) is within the vision background.

Other aspects include a method to perform the operations of the processing circuitry above, and a machine-readable medium storing instructions for the processing circuitry to perform the above operations.

BRIEF DESCRIPTION OF THE DRAWINGS

FIG. 25 is an illustrative drawing representing example training of a classifier, according to some example embodiments.

FIG. 26 is an illustrative drawing representing an example feature-extraction process and example classifier training, according to some example embodiments.

DETAILED DESCRIPTION

Introduction

Figure 1:
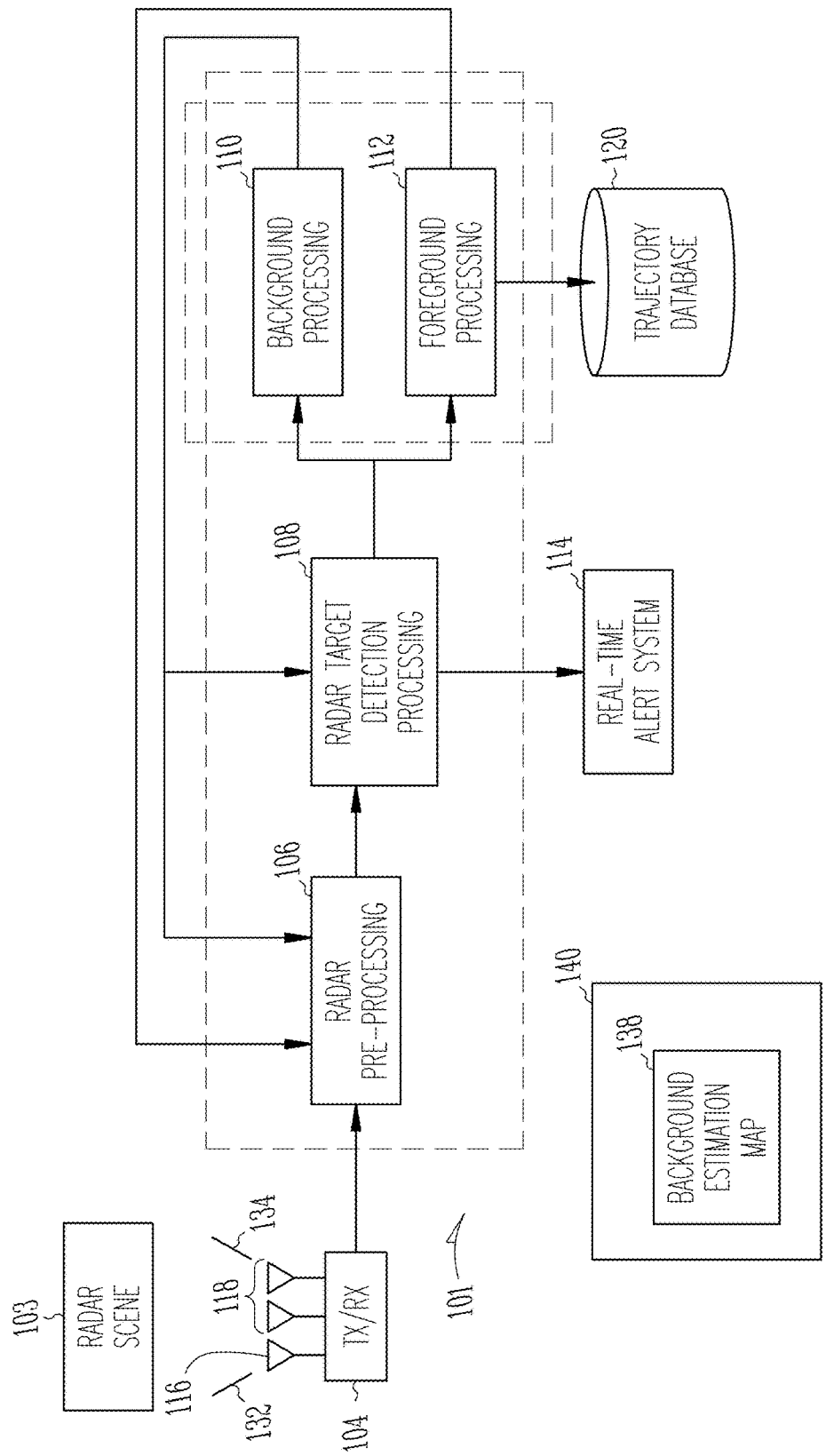
FIG. 1 is an illustrative block diagram of an example first spatial sensor system.

FIG. 1 is an illustrative block diagram of an example first spatial sensor system 100. The spatial sensor system includes a stationary radar system 101 having a radar scene, in which radar target processing is influenced using aggregated background radar data received from background objects persistently located in the radar scene 103, and also, by aggregated foreground radar data received from foreground objects transitorily located in the radar scene 103. The radar system 101 detects and tracks radar targets in real-time, while simultaneously aggregating background radar data information and foreground radar data information over a more extended time period for use in improving spatial intelligence capability, such as surveillance. As used herein, "background" radar data refers to radar data reflected from background objects persistently located within the stationary radar scene 103. As used herein, "foreground" radar data refers to radar data reflected from foreground objects that are not persistently located within the radar scene 103, but rather, are transitorily located within the radar scene 103. Foreground objects also are referred to as "targets".

The radar system 101 has a stationary position, one that does not vary with time, and therefore, has a radar field of view 134 and a corresponding radar scene 103 that are stationary. However, background objects within the radar scene 103 can vary over time within the radar scene 103. New background objects can arrive in the radar scene 103 and other background objects can depart from the radar scene 103. The radar system 101 regularly updates a background estimation map 1038, stored in a non-transitory storage device 140, that indicates background objects within the radar scene 103. As explained below, an object's persistence is measured temporally. Persistence of objects within a scene is measured over an extended time frame. The length of the time frame in which an object is measured that can be associated with a confidence level in a determination of the object's persistence, also referred to herein as a "persistence level". An object that is located at a fixed location within the radar scene 103 for at least a prescribed time duration is determined to be a persistent object and to be a part of the radar scene background. However, as mentioned above, the background object can be associated with a confidence score to indicate a level of confidence in the persistence of the object. Such confidence score can vary with time. The longer a background object is present within the radar scene 103, the greater the confidence in the persistence of the object. Foreground objects are objects not determined to be background objects.

Thus, the radar system's background estimation map 138 adapts with changes in persistent objects in the field of view. The aggregated background radar data received from background objects and the aggregated foreground radar data received from foreground objects can be used to improve detection and classification capability for spatial intelligence purposes, for example. As explained below, the radar system 101 uses the aggregated background radar data to reduce false detections due to radar clutter that can result from persistently radar scatterers persistently located in the radar scene 103. Also, as explained below, the radar system 101 uses the aggregated foreground radar data to more intelligently react to detected targets. Thus, the background estimation module 110 and the foreground activity pattern module 112 each improves the functioning of a spatial sensor system 100.

Radar-Based Spatial Sensor System Architecture

Referring to FIG. 1, the example first spatial sensor system 100 includes a radar system 101 that includes radar transmitter/receiver (Tx/Rx) unit(s) 104 coupled to a radar processing pipeline 105. The radar Tx/Rx unit(s) 104 may include Multiple Input Multiple Output (MIMO) unit(s). The radar unit(s) 104 are located in stationary position(s) so as to have stationary field(s) of view of a stationary radar scene. The Tx/Rx unit(s) 104 include antenna array(s) 132 that include(s) n-antennas in which at least one antenna acts as a transmit antenna and multiple antennas act as receive antennas. In operation, the Tx/Rx unit(s) 104 use transmit antenna(s) to transmit radar waveform signals, which may be reflected by objects (not shown) within the radar field of view 103 to the receive antenna(s) of the Tx/Rx unit(s) 104, which receives the reflected radar waveform signals and converts them from analog to digital form for processing to infer radar scene information, such as location, angle and relative speed of objects in a radar field of view 134 of the Tx/RX unit(s) 104. The radar processing pipeline 105 includes a radar pre-processing module 106, a target detection processing module 108, a background estimation module 110, and a foreground activity pattern detection module 112.

A real-time alert module 114 is operatively coupled to the target detection module 108, to issue alert information based upon information provided by the target detection module 108. For example, a real-time alert can be based on one or a combination of following: the number of objects detected, the class of the object, location of the object within the scene, and the time period in which the object is detected. The foreground activity pattern detection module 112 is operatively coupled to a trajectory database 120 used to aggregate foreground object trajectory information including one or more of Doppler measurement(s), micro-Doppler measurement(s), range measurement(s), and angle measurement(s).

The pre-processing module 106 and the target detection processing module 108 operate in real-time. The background estimation module 110 and the foreground activity pattern detection module 112 are operatively coupled to provide background and foreground information to the pre-processing module 106 and the target detection processing module 108. The background estimation module 110 and the foreground activity pattern detection module 112 are shown within dashed lines to indicate that they can be coupled to offline compute resources (not shown) to increase processing power when aggregating and processing background radar data and when aggregating and processing foreground radar data.

Performance of an example radar system 101 is as follows. The Tx/Rx unit(s) 104 have a frequency range between 5 GHz-200 GHz, and preferably between 20-100 GHz, and have a bandwidth exceeding 100 MHz. The radar data provides high resolution range and Doppler data at high frame rates (between 5-100 Frames/sec). The radar unit(s) 104 have a (combined) field of view 134: horizontal: 30 degrees to 360 degrees (surround with multiple sensor units), and vertical: 10 degrees to 180 degrees (ground and airborne targets). The radar unit(s) 104 include at least one transmitter and two receivers, and preferably use MIMO technology with multiple Tx and Rx elements to provide angular information (azimuth and/or elevation). The radar unit(s) 104 have scanning (analog beamforming or digital/MIMO) at least in azimuth direction, but preferably both in azimuth and elevation. The radar system 101 provides information in Range-Doppler, and preferable in Range-Doppler-Angle domains.

The radar processing pipeline 105 can be implemented as one or more computing machines 2200 of FIG. 22, described below. The modules 106-112 within the pipeline 105, the real-time alert module 114, and the trajectory database 120 each may be configured as one or more computing machines 2200 according to instructions stored in memory, according to hardware hard-wired into the processing circuitry, or in a combination of software instructions and hardware. Preferably the real-time target detection processing module 108 includes an accelerator (not shown) for Fast Fourier Transform (FFT) processing together with a GPU (not shown) that performs machine learning computations.

In operation, the radar Tx/Rx units 104 obtain radar data from a radar receive antenna field of view ("radar FOV"). Radar data can be obtained using a variety of transmitted waveforms. Radar data include the backscatter data reflected from objects within the radar FOV. A common transmit waveform is a sequence of chirps. Another common transmit waveform is a sequence of short pulses. Yet another transmit waveform is direct sequence spread spectrum signaling. The generation of range and Doppler from processing the return radar data from such waveforms are described below in one example. Consider a radar unit with one transmit antenna 116 and a linear array of multiple receive antennas 118. The transmit antenna sends a sequence of chirps in a burst, also called a frame. The backscattered radar data is received by the receive antennas, down-converted (typically by mixing against the transmitted chirp waveform), frequency-filtered, sampled and converted to digital format using analog-to-digital converters (not shown).

The radar processing pipeline 105 continuously produces radar data including Doppler measurements, range measurements, and angle measurements, based upon the backscattered radar data. An example pre-processing module 106 pre-processes the radar data based upon a radar scene background estimate that indicates background locations of persistent objects within the radar scene 103. An example pre-processing module 106 associates radar detection levels, for regions of the stationary radar scene 103 containing persistently located background objects, to cause the radar target detection module 108 to filter background objects to avoid false positive detections. An example radar target detection module 108 uses the background estimation to avoid misidentification of persistently located background objects as being transitorily located foreground objects. An example background estimation module 110 determines a background location of a persistent object within a radar scene 103, based at least in part upon the radar target detection module 108 detecting multiple short radar tracks at the background location within the radar scene. An example pre-processing module 106 pre-processes the radar data based upon foreground scene activity patterns. An example pre-processing module 106 associates a portion of the radar scene 103 with a foreground activity pattern, to cause the radar target detection module 108 to apply one or more rules to a detected radar target, based upon the foreground activity pattern. An example radar target detection module 108 causes issuance of an alert signal based upon a rule associated with a foreground activity pattern. A foreground estimation module 112 determines foreground activity patterns, based at least in part upon the radar target detection module 108 detecting multiple radar tracks within the radar foreground having a similar pattern.

More particularly, the radar pre-processing module 106 receives the digital radar data from the Tx/Rx unit(s) 104 for pre-processing. The radar pre-processing module 106 receives background estimate information produced using the background estimation module 110. The radar pre-processing module 106 associates the received radar data with first (background) metadata that identifies portions of the radar scene 103 indicated by the background estimate information to contain background objects requiring special processing. For example, the first metadata may include background mask information that indicates background objects that identified as sources of radar clutter. The pre-processing module 106 is configurable to receive foreground activity pattern information produced using the foreground activity pattern detection module 112. The radar pre-processing module 106 associates the received radar data with second (foreground) metadata that indicates portions of the radar scene 103 indicated by the foreground activity pattern information to require special processing. For example, the second (foreground) metadata may be used to influence the provision of alerts based upon foreground target trajectories within the portions of the radar scene 103 indicated by the foreground activity pattern information.

Figure 2:
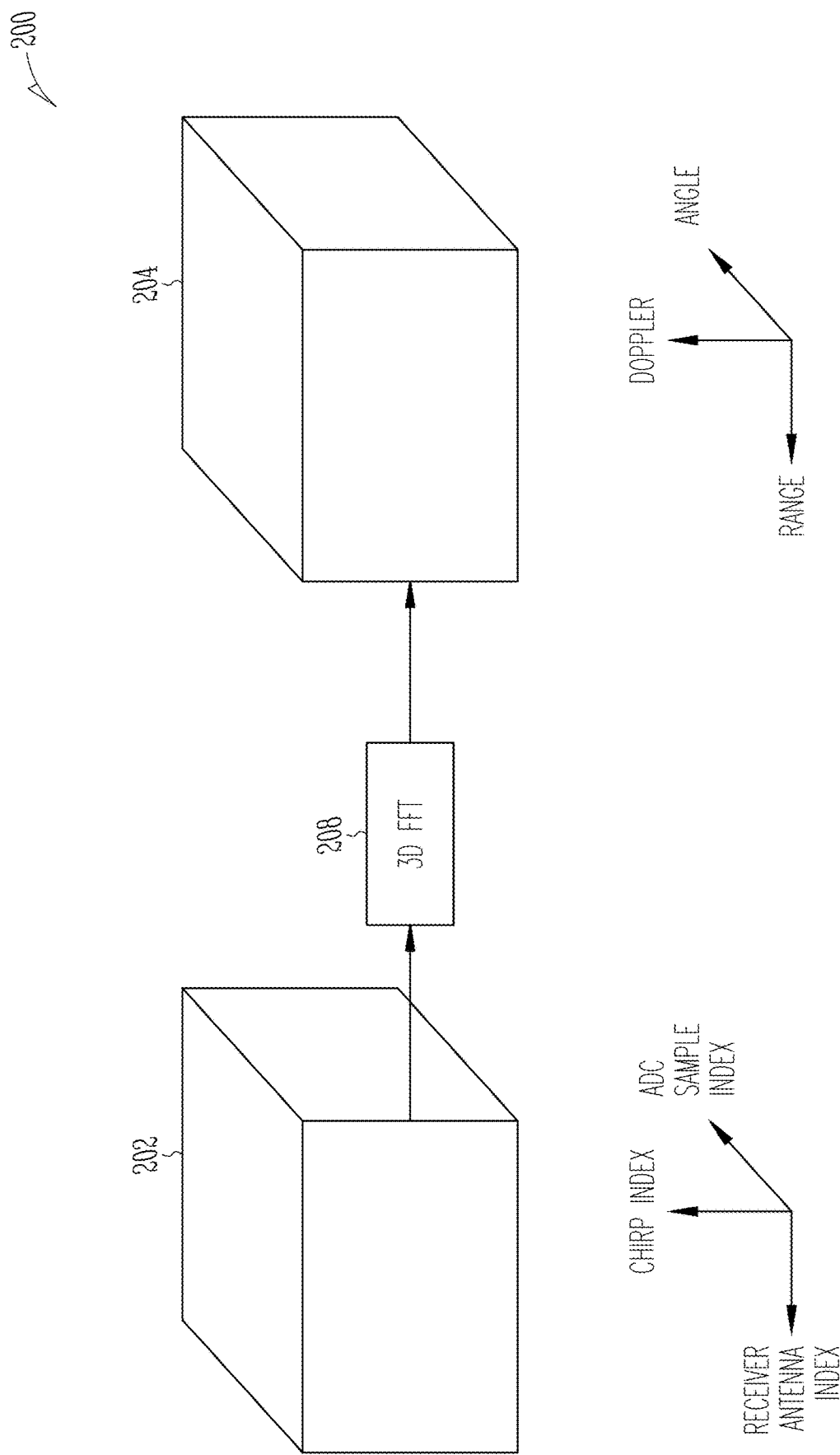
FIG. 2 is an illustrative drawing representing an example three-dimensional Fast Fourier Transform applied to radar data.

The target detection processing module 108 detects objects in the radar scene 103. FIG. 2 illustrates operation of the target detection processing module 108 using an example three-dimensional Fast Fourier Transform (FFT) 208 applied to radar data, to detect targes within the radar scene 103. As shown, a received radar data block 202 has the axes ADC sample index, chirp index, and receiver antenna index. The target detection processing module 108 applies a 3D FFT 208 to the received radar data block 202 to yield processed radar data block 204. Radar data block 204 has the axes angle, Doppler, and range. As illustrated in FIG. 2, the received radar data block has three dimensions: ADC samples per chirp ("fast time"), chirp index within a frame ("slow time") and receive antenna element. As shown in FIG. 2, this can then be converted to range-Doppler-angle space (processed radar data block 204) by taking a 3D FFT 208. The FFT 208 in fast time produces range bins, the FFT 208 across slow time produces Doppler bins, and the FFT 208 across receive elements produces angle bins. Some aspects operate in such a transform domain since it provides a geometric interpretation of the collected data. Thus, the radar target detection processing module 108 detects and identifies targets in terms of at least range, angle, and Doppler. Moreover, a peak signal-to-noise ratio (PSNR) parameter can be selected for a target detection.

Through capture of radar data over an extended period of time (e.g., days or weeks, or months) the radar target detection processing module 108 captures one or more radar tracks corresponding to objects detected within the radar scene 103. The number of tracks captured can be any number greater than or equal to one. Each radar track includes one or more Doppler measurements, one or more range measurements, and one or more angle measurements. The radar target detection processing module 108 provides the radar tracks to the background estimation module 110 and to the foreground estimation module 112. Conversely, a background mask produced using the background estimation module 110 can be used to filter targets detected using the radar target detection processing module 108. Background filtering can involve ignoring targets that are identified as background objects. Alternatively, as explained with reference to the example embodiment of FIG. 10, filtering can involve further processing using another sensor, such as a vision sensor, to determine whether a target detected at a background location is a background object or a foreground object. Moreover, foreground activity pattern information produced using the foreground activity pattern module 110 can be used to filter targets detected using the radar target detection processing module 108. Foreground filtering can involve causing the radar target detection processing module 108 to cause an alert signal in response to a detected target, based upon a foreground activity pattern.

The background estimation module 110 aggregates processed radar data and produces the background estimation map 138, which indicates location in terms of angle (elevation and azimuth) and distance of persistent objects in the radar scene 103. The background estimation module regularly updates the background estimation map 138 to ensure that it keeps up to date with changes in the scene. Because the background of the radar scene 103 can change over time, the frequency of background estimation should be high enough (e.g. every 10 minutes) to update the background information in a timely manner, depending on scene dynamics. The background estimation map 138 can perform background estimation both online and offline. Offline background estimation can utilize more computation resources to compute a more accurate estimation of the background.

The background estimation module 110 analyzes the processed radar data over an extended time interval, as explained more fully below, to identify background objects that are sources of radar clutter. Radar clutter generally comprises unwanted backscattered radar data that interferes with observation of desired radar data. Meanwhile, in real-time, the target detection processing module 108 tracks detect and tracks targets and captures trajectory information including range, angle, and Doppler, as the target moves within the radar scene 103. Machine learning techniques including deep learning CNN-based algorithms can be used to classify the target based upon the captured trajectory information and possibly additional information. The background estimation module 110, operating over an extended time interval, produces first (background) metadata that includes background mask information for use to cause the target detection processing module 108 to ignore locations of the radar scene background of objects that behave as sources of radar clutter. The example target detection processing module 108 uses the background mask information to identify radar scene locations at which to filter out target detection to avoid background object radar clutter. More particularly, the mask information indicates radar clutter source locations within the radar scene 103 for which a detection threshold parameter, e.g., a PSNR threshold, is adjusted so as to not mis-identify a persistent clutter source (to be ignored) as potential foreground target (to be tracked), and to thereby avoid false positive target detections, for example.

The foreground activity pattern detection module 112 aggregates and analyzes foreground information to identify foreground activity patterns. In the example first spatial sensor system 100, the foreground information comprises foreground object (target) trajectories. A time series of locations for a tracked object is termed a trajectory. The trajectory information includes range, distance, and Doppler for the series of locations. The trajectory information also can include other associated metadata such as starting point and ending point, velocity, and time of day. The associated metadata also can include information derived using machine learning techniques such as object class (e.g., person, animal, bicycle, car) or an activity (e.g., walking, running, carrying an object) identified using machine learning involving micro Doppler measurements. The foreground activity pattern detection module 112 stores trajectory information at the trajectory database 120. Machine learning techniques including deep learning CNN-based algorithms can be used to generate the classifications. Aggregated trajectory information is accessed from the database 120 to data mine for occurrences of activity patterns within the radar scene 103. These activity patterns can be used to create rules for generation of alert signals at the real-time alert system 114. Machine learning techniques including deep learning CNN-based algorithms can be used to generate rules. For example, processing of the trajectory information may identify a path within the radar scene 103 that is heavily trodden by people during daytime but almost never used in the evening. Based upon such determination, the foreground activity pattern detection module 112 may produce a rule that no alert signal is to be issued in response to detecting a person walking along the path during day time, but an alert signal is to be issued in response to detecting a person walking along the path in the evening. Continuing with the example, the foreground activity pattern detection module 112 can cause the radar pre-processing module 106 to associate a rule with received radar data (as second (foreground) metadata) to be applied using the radar target detection module 108, in response to detecting a target at the identified path location in the radar scene 103 and causing an alert signal.

An hypothetical example alert rule can require that an alert signal be generated in response to detection of a radar track, the radar track: having radar data measurements, processed using machine learning, that indicate that the track corresponds to a person; the radar track having a trajectory path that includes a portion of a radar scene, identified using machine learning, as corresponding to a parking lot: the radar track having a after a time of day of 1:00 AM. The example alert rule is developed, for example, using machine learning based at least in part upon radar foreground activity patterns that indicate that a radar track detection event that involves person crossing a parking lot in the middle of the night is unusual, since it is well outside of the normal activity patterns. An alert rule, therefore, can generate alert in response to unusual activity.

Additionally, as explained more fully below, an example foreground activity pattern detection module 112 also can identify occurrences of multi-reflector objects within the radar scene 103, where duplicate objects appear due to multi-reflections from background objects. The foreground activity pattern detection module 112 can provide metadata to the radar target processing module 108 a location within the radar scene 103 of such a multi-reflector so that a detection parameter (e.g., a PSNR threshold) of the radar target processing module 108 can be adjusted to suppress detection of ghost images resulting from multiple reflections caused by the multi-reflector. An example embodiment of the system disclosed with reference FIG. 13, uses a vision system (explained below) to aid in identification of such ghost object.

Background Mask Generation and Use

Figure 3:
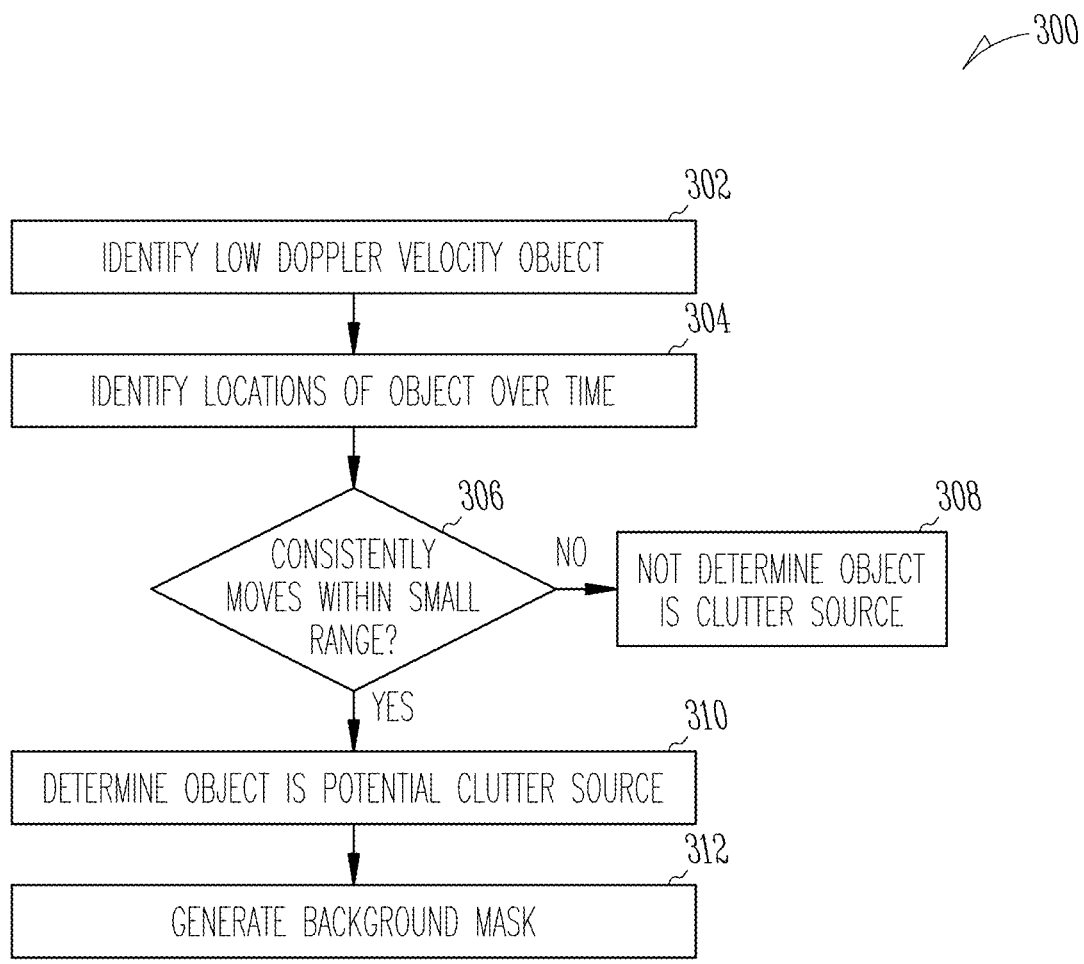
FIG. 3 is an illustrative drawing flow diagram representing an example method to produce a background mask.

FIG. 3 is an illustrative drawing flow diagram representing an example method 300 to produce a background mask to remove persistent radar clutter sources from the radar scene 103. One or more processor circuits of the radar processing pipeline 105 of FIG. 1, are specially configured according to computer executable instructions to implement the operations of the method 300. In the example first spatial sensor system 100, a background mask indicates location in the radar scene 103 of a background object that behaves as a radar clutter source. An example background mask is used to suppress target detection at the indicated location of the clutter source. In an example first system 100, the pre-processing module 106 associates first metadata with an indication of the location of the clutter source in the radar scene 103 to causes an increase in a threshold detection parameter for radar data at that location, to cause the radar target detection module 108 to not detect a target at that location. At operation 302, background estimation module 110 identifies a location within the radar scene 103 where a frame of radar data includes a target track having a Doppler velocity that is below a predefined threshold that is indicative of a radar track that is short enough to have been produced by a persistently located background object having a movement pattern that causes radar clutter.

In an example system 100, a track that has a Doppler velocity less than or equal to a prescribed threshold Doppler velocity for at least a prescribed amount of time is determined to be a background object. For example, a Doppler velocity less than 0.4 m/sec is believed to be sufficient to distinguish what may be a moving object, having a short target track at a persistent location range, from moving object that has a longer target and that is not persistently located. A low Doppler velocity is indicative of a short range of motion and a short radar track. It will be understood that a persistently located background object may have a low Doppler velocity because it is shaking or vibrating, or jittering, which can cause it to be a radar clutter source. The locations of the target can be in world coordinate or radar coordinate (e.g., range-angle domain), for example.

At operation 304, the background estimation module 110 measures the locations of the short (low velocity) radar track over a prescribed measurement time interval. An example operation 304 uses a prescribed measurement time interval in which to observe radar track motions at a radar scene location that is long enough that a large enough number of location measurements are obtained during the measurement time interval to ascertain to within a prescribed confidence level whether a low velocity radar track is consistently moving between locations that are spaced so closely as to be a persistent location within the radar scene 103. A prescribed measurement time interval can be situation dependent. For example, the prescribed time interval may be different for a radar scene in a rural area than a radar scene in a commercial area. In an example system 100, measurement of range of motion over a measurement time interval in a time range 12-24 hours is used to determine whether a low Doppler velocity object is a persistently located background object.

Another example operation 304 determines features of motion of a radar track to determine whether the radar track motion is characteristic of one or more known types of background objects, as determined through machine learning for example, together with the radar track having a Doppler velocity that is below a predefined threshold, can be used to determine that the radar track represents a background object. For example, it is known that some objects like trees do a swinging motion, so the change in their speed is minimal. Also, during normal wind conditions the wind speed and hence the motion is consistent and low. By observing radar track motion that is consistent and localized, machine learning can predict this radar track likely corresponds to a "tree" or other persistently located object in the radar scene. A radar background estimate is updated to indicate a location that corresponds to a persistently located background object. Thus, the updated radar background estimate can be used to determine that a subsequent radar track that corresponds to the same location is to be identified as a background object even if the subsequent radar track is moving more rapidly, due to a high wind situation, for example.

At operation 306, the background estimation module 110 determines, based upon the positions of the radar track of the object measured during measurement time interval, whether the identified low velocity object is a persistently located background object. More particularly, a determination of whether the low velocity object is a persistently located object is based upon a measure of range of motion of the object. In an example first surveillance system 100, a range of motion of less than about 0.4 m/sec is used to determine whether the low velocity/short radar track object is consistently moving within the radar scene 103 but without significant change in location. More particularly, for an identified low Doppler velocity object, the measured locations are averaged to determine whether the object has a persistent location, albeit within some limited range of locations. The averaging can be done by computing an arithmetic mean of the object's location during the measurement time interval. Alternatively, a weighted average can be determined based upon on the freshness of results, recent radar data frames being more heavily weighted than older radar data frames. At operation 308, in response to determination that the object is not consistently moving within a prescribed small range of locations, the object is not determined to be a clutter source. At operation 310, in response to determination that the object is consistently moving within a prescribed small range of locations, the object is determined to be a clutter source. At operation, 312, the background estimation module 110 generates a background mask that includes information that indicates the determined location or range of locations of the low Doppler velocity persistently located object. The background mask information is communicated to the radar target detection processing module 108 via the pre-processing module 106. More particularly, an example mask causes the radar pre-processing module 106 to adjust a threshold detection parameter used by the radar target detection processing module 108 for radar data at the determined range of locations, so that the detection module 108 does not detect tracks having a location within the determined range, thereby reducing false positive detections.

Figure 4A:
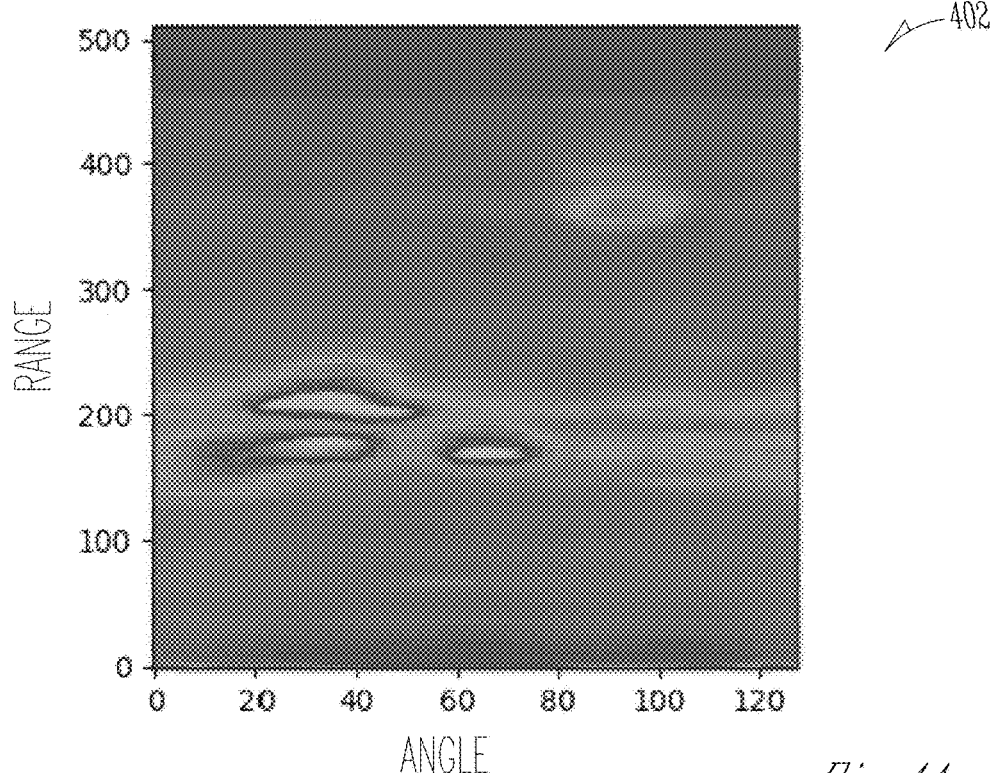
FIG. 4A is an illustrative drawing showing example radar tracks indicating a persistent object in a radar scene.
Figure 4B:
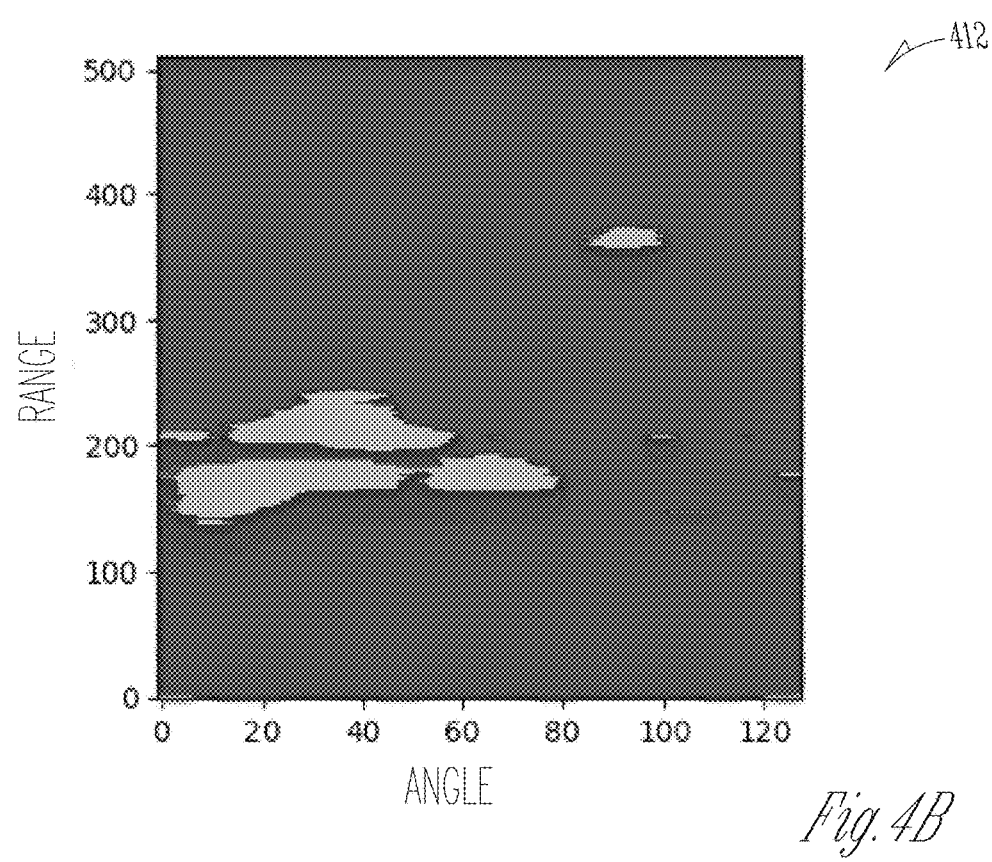
FIG. 4B is an illustrative drawing showing an example background mask for the persistent object of FIG. 4A.

FIG. 4A is an illustrative drawing showing example radar tracks indicating a persistent object in a radar scene. More particularly, the persistent track is represented as a range versus angle plot 402 of averaged location measurement results within the radar scene 103 for multiple low Doppler velocity/short radar track background objects moving consistently within a small location range. FIG. 4B is an illustrative drawing showing an example background mask for the persistent object of FIG. 4A. More particularly, the background mask is represented as a range versus angle plot 412 representing a background mask generated based upon the location ranges of FIG. 4A. The moving objects can be shaking objects such as shaking leaves of a tree, for example. The plots 402 and 412 of FIGS. 4A-4B show Range/Angle plotted in sample points. The plot 402 shows averaged detection results. Lighter regions indicate objects that are consistently shaking within a small location range within the radar scene 103, and that are determined to be background objects to be filtered out. The plot 412 of FIG. 4B represents a background mask used to filter detections of the low Doppler velocity objects from the radar data. The example background mask is generated in radar coordinate (range/angle). The lighter regions of the mask indicate the background masked regions of the radar scene A03 to be filtered out of the radar processing pipeline to avoid false positives.

Figure 5:
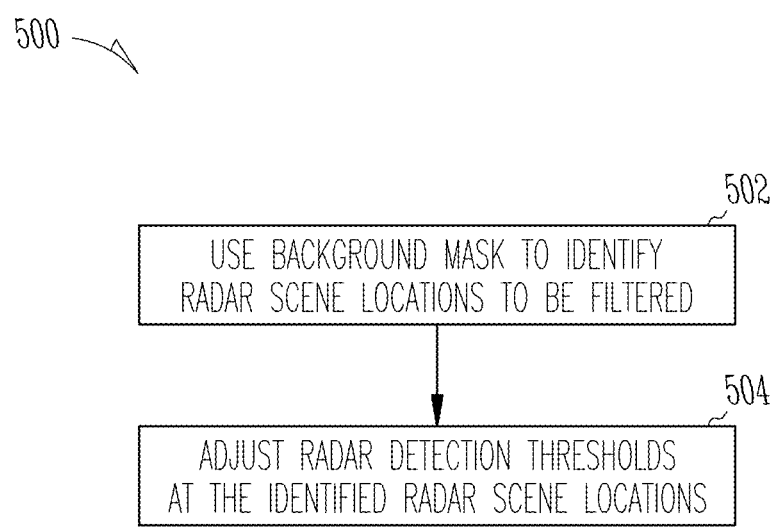
FIG. 5 is an illustrative drawing flow diagram representing an example method to use the background mask of FIG. 4A to filter radar data.

FIG. 5 is an illustrative drawing flow diagram representing an example method 500 to use the background mask 412 of FIG. 4B to filter radar data. One or more processor circuits of the computing machine 102 are specially configured according to computer executable code to implement the operations of the method 500. At operation 502, the pre-processing module 106 uses the background mask 412 as first (background) metadata to indicate radar scene locations (range/angle) of received radar data that are not to be filtered out during detection and to cause increase in a detection threshold for the masked radar scene locations. At operation 504, the processing module 108 uses the mask to exclude from detection, radar scene locations identified by the background mask.

Trajectory Mining and Use

The example first surveillance system 100 observes a scene continuously and builds a database of the trajectory information (2D or 3D tracks), which includes information such as, start, point, end point, velocity, position, time, class, and activity. Geometric and semantic information of the radar scene 103 can be used to mine foreground activity patterns from the stored trajectory information that can shed light on target object behavior. An improved understanding of target behavior (e.g., behavior of persons, cars, animals) can be used as a basis to develop improved rules for managing alerts issued by the real-time alert system 114, for example.

Figure 6:
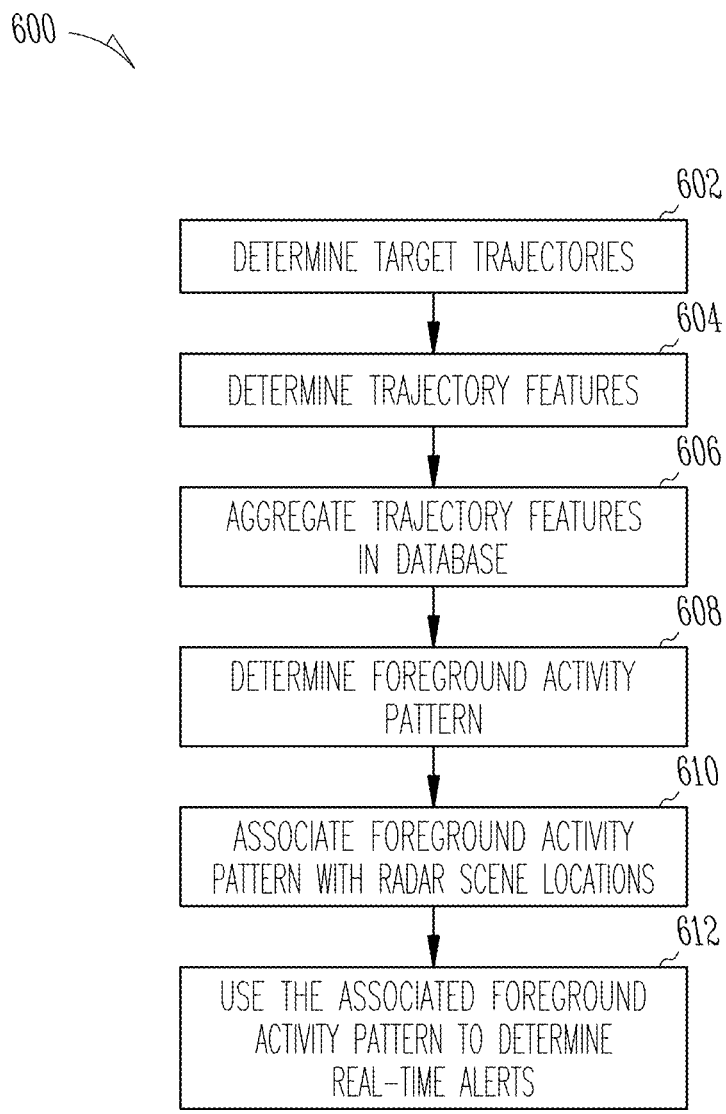
FIG. 6 is an illustrative flow diagram representing a method to use trajectory information to filter radar data.

FIG. 6 is an illustrative flow diagram representing a method 600 to use aggregated trajectory information to as a basis to issue surveillance alert information. Aggregated trajectory information can be used to identify foreground activity patterns associated with locations within the radar scene 103. One or more processor circuits of the radar processing pipeline 105 are specially configured according to computer executable instructions to implement the operations of the method 600. At operation 602, the received radar data are processed using the radar target processing module 108 to determine target trajectories represented in the radar data, each trajectory including, Doppler measurement(s), micro-Doppler measurement(s), range measurement(s), and angle measurement(s). At operation 604, the received trajectories are analyzed using the foreground activity pattern detection module 112 to determine, for each trajectory, features including, starting and ending points of the trajectory within the radar scene 103, location of the trajectory within the radar scene, velocity, classification (e.g., person, dog, cat, car, bus), activity (e.g., walking, running, waving of arms—based upon micro Doppler), and time of occurrence.

Foreground activity patterns are determined based upon similarities among features of different detected trajectories within the radar scene, such as similar trajectory starting and end points within the radar scene, similar locations of trajectories within the radar scene, similar trajectory velocities within the radar scene, similar times of occurrence within the scene, similar classifications, and similar activities. It will be appreciated that determining classification and activity, for example, can involve machine learning techniques including deep learning CNN-based algorithms. In such hypothetical example machine learning processes, events such as a particular trajectory or a velocity are weighed based upon frequency of occurrence such as, for example, the number of times a car passes through trajectory A with velocity B. There typically is a set bound for definition of a trajectory within a few meters, for example, as well as a range for velocity. These radar track events are aggregated over time at a trajectory database 120 described below with reference to FIG. 16, based on number of occurrences over a period of time. Multiple tracks that fall within similar trajectory and velocity ranges can be used to determine an activity pattern. Events that occur more often are weighted more heavily than events that occur less often, which means that some activity patterns can have a greater confidence level than others.

At operation 606, over the course of sampling a multiplicity of radar data frames, the foreground activity pattern detection module 112 causes the trajectory features for the multiplicity of received data frames to be stored in the trajectory database 120 described below with reference to FIG. 16. The trajectory database 120 is used to aggregate trajectory features from the multiplicity of radar data frames to make the features available for processing to identify foreground activity patterns buried within the trajectory features. At operation 608, foreground activity pattern detection module 112 processes the trajectory feature information stored in the trajectory database 120 to identify foreground activity pattern information. At operation, 610, pre-processing module 106 then can use second (foreground) metadata to associate foreground activity pattern information with radar scene locations. At operation 612, processing module 108 can be configured to control the issuance of alerts by the real-time alert system 114, at least in part, based upon the foreground activity pattern information.

Figure 7A:
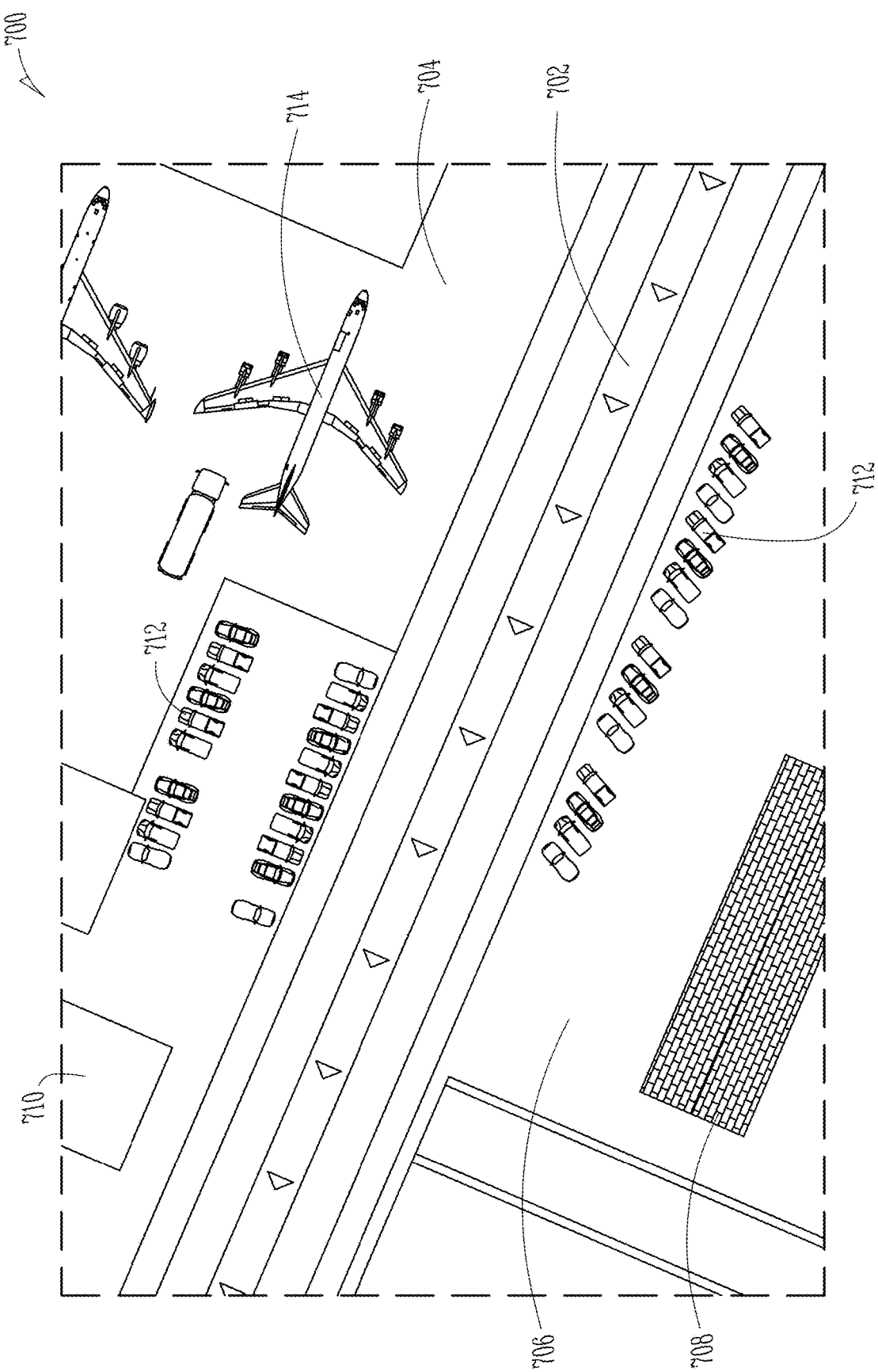
FIG. 7A is an illustrative drawing showing an example ariel view of a real-world geographic location.
Figure 7B:
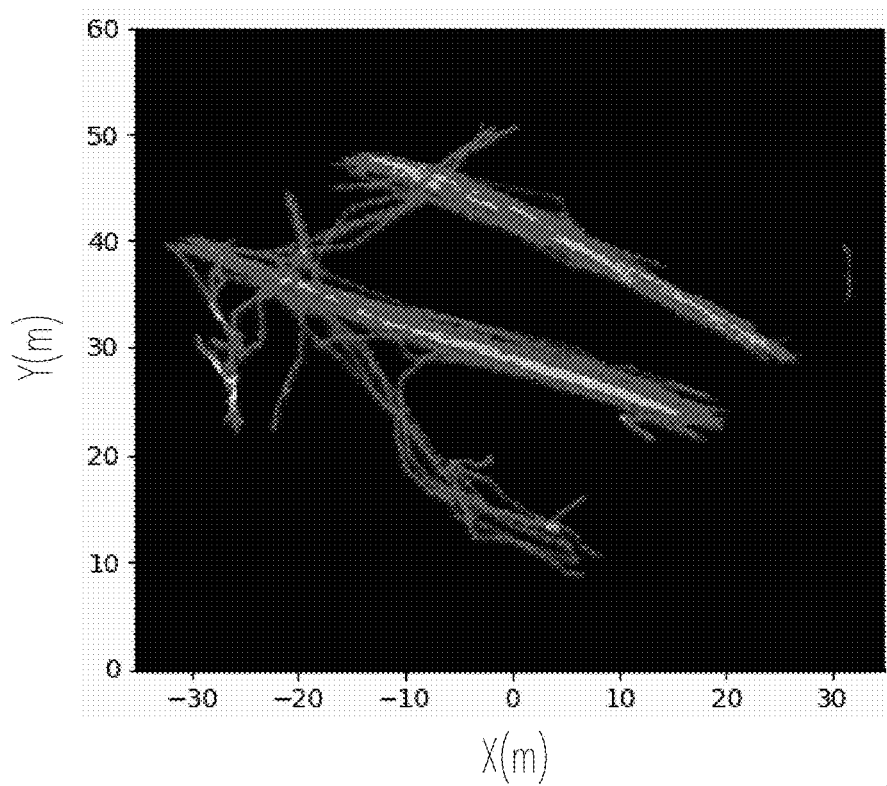
FIG. 7B is an illustrative drawing showing a first heat map that shows a pattern of motor vehicle driving activity at the geographic location of FIG. 7A.
Figure 7C:
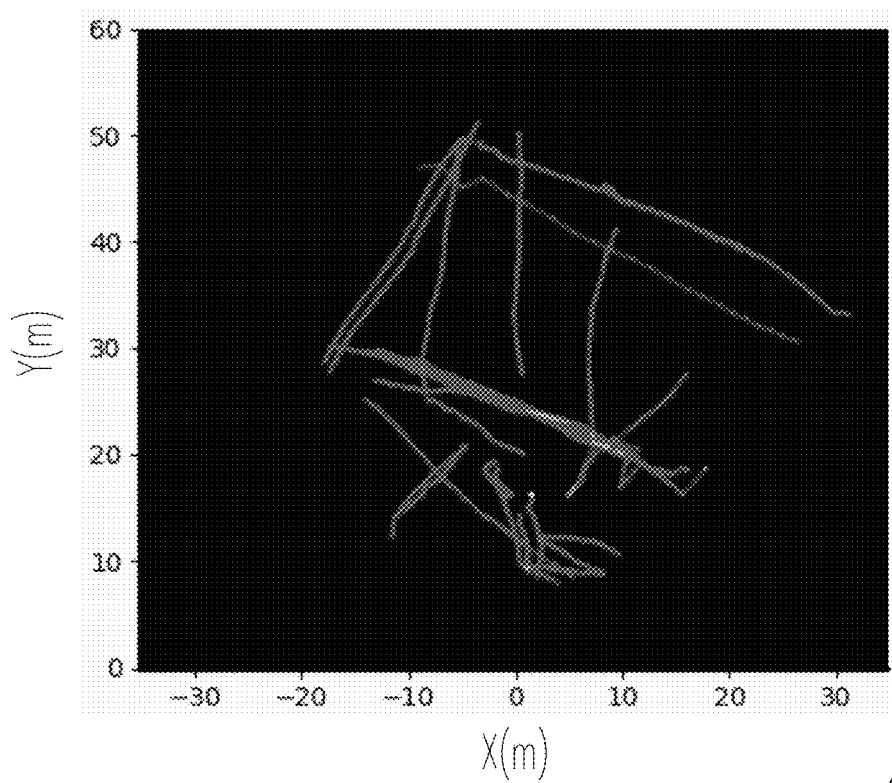
FIG. 7C is an illustrative drawing showing a second heat map that shows a pattern of person walking activity at the geographic location of FIG. 7A.

FIGS. 7A-7C are illustrative drawings showing a real-world visual image of an ariel view of an example real world geographic location 700 (FIG. 7A) a first "heat map" 716 that represents a foreground activity pattern involving motor vehicle driving activity at the geographic location 700 (FIG. 7B), and a second heat map 718 (FIG. 7C) that represents a foreground activity pattern involving person walking activity at the geographic location 700. Referring to FIG. 7A, the location 700 includes a road 702, two parking lots 704, 706, two buildings 708, 710 parked motor vehicles 712, and a parked airplane 714.

Referring to FIG. 7B, the first "heat map" 716 includes bright regions that indicate foreground activity patterns representing multiple vehicle trajectories within the geographic location 700. Each of numerous thin bright streaks indicates one or more instances of a vehicle driving along one or more of the roads and the parking lots. Each bright streak represents radar data from one or more radar data frames, stored in the trajectory database 120. Similarly, referring to FIG. 7C, the second "heat map" 718 includes bright regions that indicate foreground activity patterns representing multiple human walker trajectories within the geographic location 700. Each of numerous thin bright streaks indicates one or more instances of a person walking geographic location 700. Each bright streak represents radar data from one or more radar data frames, stored in the trajectory database 120. Aggregated trajectory information from a multiplicity of radar data frames is accessed from the database to produce the first heat map 716 and to produce the second heat map 718. It will be appreciated that the example of the first heat map 716 and the example second heat map 718 are produced based upon starting and ending points, position (each streak represents position of one or more walker's paths within the location 700) and classification (vehicle or person).

The target detection processing module 108 can be trained to control the alert module 114 based at least in part upon foreground activity patterns revealed in the heat maps. For example, the target detection processing module 108 can be trained to use the foreground activity patterns revealed in the first and second heat maps 716-718 to identify a real-time radar track corresponding to an abnormal activity in real time (e.g., a person or vehicle crossing a closed gate, a person crossing a fence, a jay walker), and to trigger the real-time alert module 114, based upon abnormal detected activity. Conversely, the target detection processing module 108 can be trained to use the foreground activity patterns revealed in the first and second heat maps 716-718 to identify a real-time radar track corresponding to a normal activity in real time (e.g., a person or a car moving within the parking lot), and to not trigger the real-time alert module 114, based upon normal activity. It will be appreciated that the target detection processing module 108 can be trained, using machine learning techniques including deep learning CNN-based algorithms, to apply different alert trigger rules depending upon whether the foreground activity patterns represent vehicle motion and people motion, for example.

Fused Background Estimation in a Multi-Sensor Surveillance System

Figure 8:
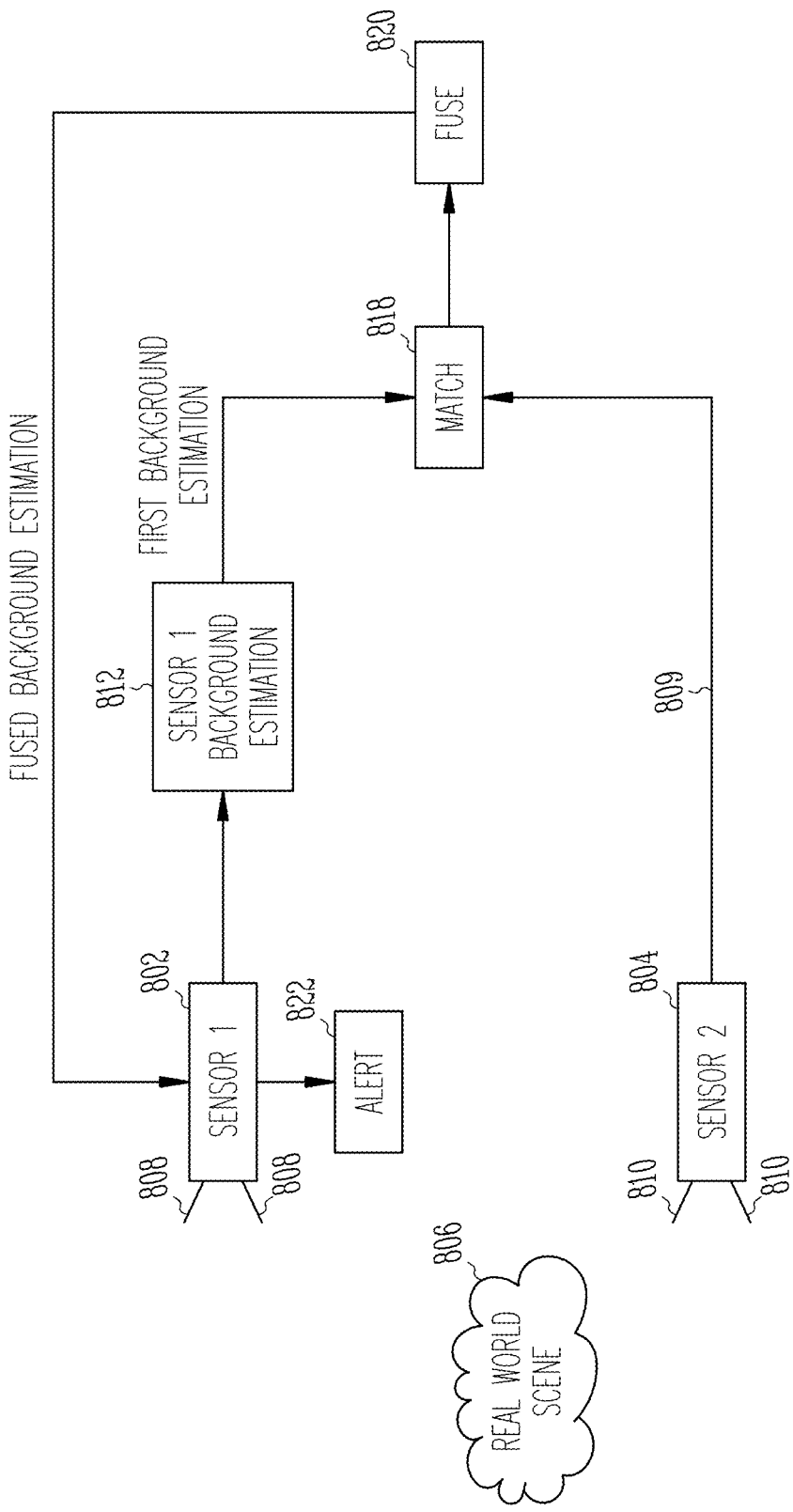
FIG. 8 is an illustrative block diagram showing an example spatial sensor system that includes a first sensor and a second sensor that are configured to sense data from a common real-world scene.

FIG. 8 is an illustrative block diagram showing an example spatial sensor system 800 that includes a first sensor 802 and a second sensor 804 that are configured to sense data from a common real-world scene 806. One or more processor circuits of the machine 2200 of FIG. 22 are specially configured according to computer executable instructions to implement the surveillance system 800. The first sensor 802 has a first field of view (FOV) 808 of the scene 806 and produces first sensor measurements 807. The second sensor 802 has a second FOV 810 of the scene 806 and produces second sensor measurements 809. A first background extraction module 812 extracts a first background measurement estimation of the scene 806 based upon scene data captured from the scene 806 using the first sensor 802. The dashed lines between the first sensor 802 and the first background extraction module 812 indicate that the background information can be extracted from the first sensor data over a long period of time or during sensor installation. A match module 818 matches locations in the first field of view 808 corresponding to the first sensor 802 with locations in a second field of view 810 corresponding to the second sensor 804. In an example system 808, the match module 818 uses a homography transformation, explained below with reference to FIGS. 9A-9B. A data fusion module 820 fuses the first background measurement estimation and second sensor measurements corresponding to matched locations in the first and second fields of view 808, 810 to produce a fused background estimation, which provides a more accurate first background measurement estimation than first background measurement estimation alone. The data fusion module 820 causes the fused background estimation information to be transmitted as input to the first sensor 802 for use as a background estimation at the first sensor. The first sensor 802 is configured according to rules, based upon foreground targets detected within the first FOV 808, to cause an alerts module 822 to issue alerts. The alerts can be delivered audio or visual and can be transmitted over a network and can be stored in a storage device for replay, for example.

In an example surveillance system 800, the first sensor 802 comprises a radar system and the second sensor 804 comprises a computer vision device (CVD) In alternative example embodiments, the first and second sensors 802, 804 can be of the same kind of sensor or can be different kinds of sensor. In example alternative embodiments each of the first and second sensors 802, 804 can be any one of a radar system, an Inertial Measurement Unit (IMU) unit, RGB Camera, Depth sensor, IR camera (or RGBI), Thermal Camera, UWB sensor, or GNSS.

Calibration of Multi-Sensor Surveillance System Based Upon Overlapping FOVs

In a multi-sensor surveillance system, fusing measurements between sensors requires calibrated transforms for converting each point of each respective field of view (FOV) to the corresponding point in the FOV of each of the other sensors. This is true if the FOVs are different regions of the same domain (e.g. 2 cameras with different views), or for different domains altogether (e.g. a camera and a radar device). To accurately calibrate these transforms, ground truth point correspondences (i.e. not subject to sensor uncertainties) must be established in the overlapping regions of the respective FOVs. Once sufficient correspondences have been collected, functions mapping between grouped points can be derived. During runtime, these functions can be used to match background or foreground measurements across sensors, reinforcing confidence in the respective estimates, and enabling building of a multi-domain scene understanding.

Figure 9A:
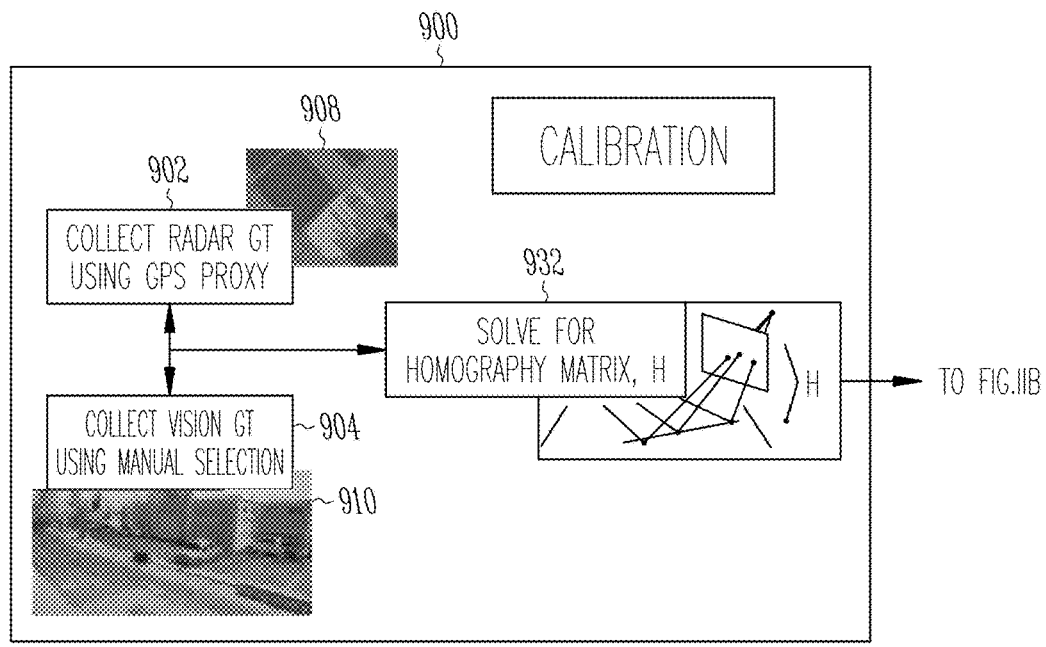
FIG. 9A is an illustrative drawing representing a setup to calibrate first and second sensors, of a multi-sensor system, with reference to a ground truth reference.
Figure 9B:
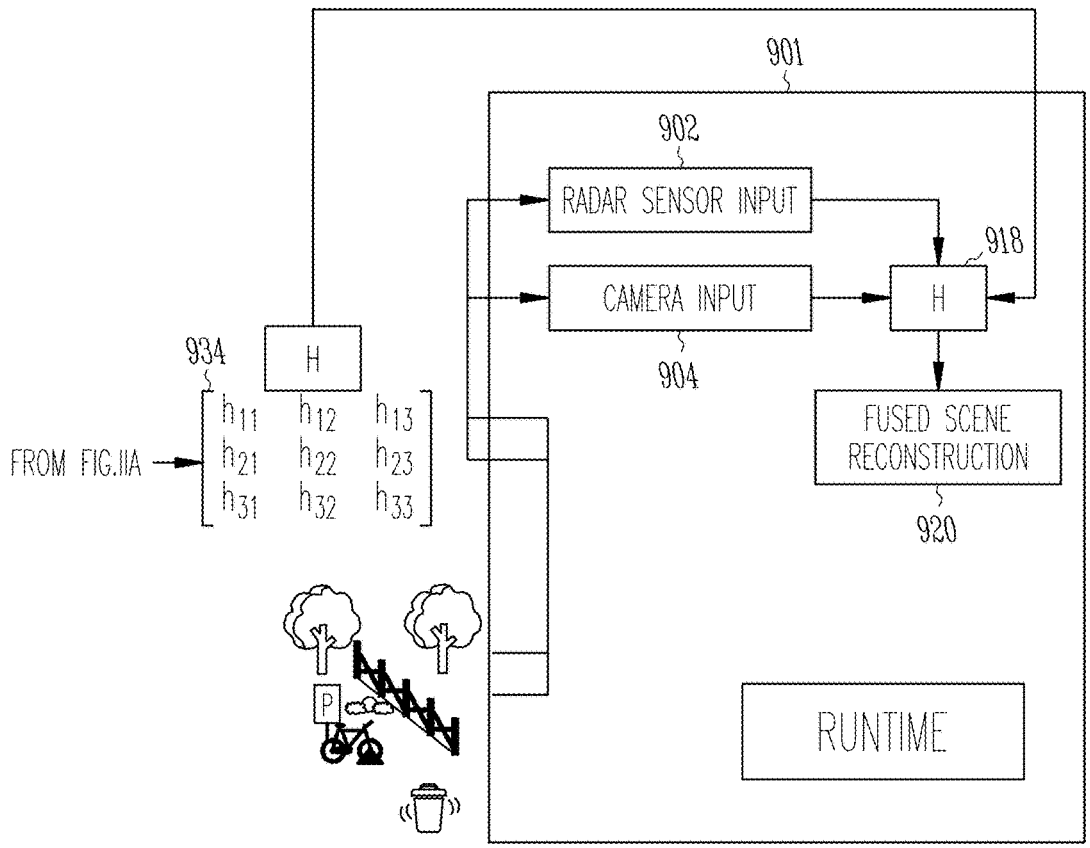
FIG. 9B is an illustrative drawing showing runtime operation of the multi-sensor system using calibration information generated using the setup of FIG. 9A.

FIG. 9A is an illustrative drawing representing a calibration setup 900 to calibrate first and second sensors, of a multi-sensor system 901, with reference to a ground truth reference. FIG. 9B is an illustrative drawing showing runtime operation of the multi-sensor system 901 using calibration information generated using the setup of FIG. 9A. In the system 901 of FIG. 9B, a first sensor 902 is a radar sensor and the second sensor is a CVD sensor 904. In operation, sensor measurements produced by the first sensor 902 and corresponding sensor measurements produced by the second sensor 904 are matched using a match transform module 918, and the matched sensor measurements are fused using a fusion module 920.

The following explains derivation and use of the "H" transform used to configure the match module 918.

Referring to FIG. 9A, radar ground truth (GT) data is collected at the radar sensor 902 and vision GT is collected at the CVD sensor 904. A processing module 932 computes a homography transform matrix "H" 934 that associates location points in a radar sensor scene/FOV 908 to location points in a CVD sensor scene/FOV 910.

Ground truth location points for the radar sensor 902 and for the CVD sensor 904 are collected. Radar sensor measurements provide relative offset from the sensor in the 'ground plane' (i.e. a projection of the world onto the 2D plane parallel to the ground). Camera measurements exist in the 'image plane' (i.e. a projection of the world onto the 2D plane parallel to the camera sensor). We take the following steps to convert between these two domains. As to ground truth location data for the radar sensor 902, relative ground plane offsets can be measured with high fidelity using GPS location. As represented by the highlighted portion of radar FOV 908, by moving a GPS antenna around a scene of interest, we can imitate radar with minimal uncertainty. The location of the GPS antenna in the radar FOV 908 represents ground truth since location of the GPS antenna is know with certainty due to GPS measurements. Therefore, tracking location of the GPS antenna within the radar FOV correlates ground truth GPS antenna locations with location points within the radar FOV 908 such that locations within the antenna FOV are correlated with ground truth GPS antenna locations. As to ground truth location data for the CVD sensor 904, while computer vision models are rapidly improving their ability to perform object localization in a scene, humans can still do this task with relative ease and higher accuracy for favorable scenes. We therefore have an operator select the pixel corresponding to the GPS antenna location in the camera FOV 910 (see the bright dots) as the antenna moves throughout the scene during radar calibration, creating the necessary correspondence pairs between GPS antenna ground truth location points and CVD pixels in the CVD sensor FOV 910.

A homography ("H") transformation is developed as follows. The collected correspondences provide two sets of matching 2D points—in the ground plane and image plane domains respectively. The relationship of these two planes is some composition of rotation, translation, and scaling. Accordingly, it can be encapsulated in a 3×3 'homography' matrix and transforming between domains reduces to a simple matrix multiplication. Using the correspondence pair, we solve for this matrix, H, to minimize the following error:

$$\sum_i \left( x_i' - \frac{h_{i1}x_i + h_{i2}y_i + h_{i3}}{h_{i1}x_i + h_{i2}y_i + h_{i3}} \right)^2 + \left( y_i' - \frac{h_{i1}x_i + h_{i2}y_i + h_{i3}}{h_{i1}x_i + h_{i2}y_i + h_{i3}} \right)^2$$

During runtime, we convert between points with the following equation:

$$s_i \begin{bmatrix} x_i' \\ y_i' \\ 1 \end{bmatrix} \sim H \begin{bmatrix} x_i \\ y_i \\ 1 \end{bmatrix}$$

Referring again to FIG. 9B, the match module 918 is configured using the H matrix such that at runtime, the match module 918 can correlate GT location points in first radar measurements produced using the first sensor 902 with corresponding GT location points in second radar data produced using the second sensor 904. Thus, calibration associates GT location points represented in the radar VOV 908 with corresponding GT points represented in the CVD FOV 910.

Multi-Sensor System Comprising Radar Sensor and CVD Sensor

Figure 10:
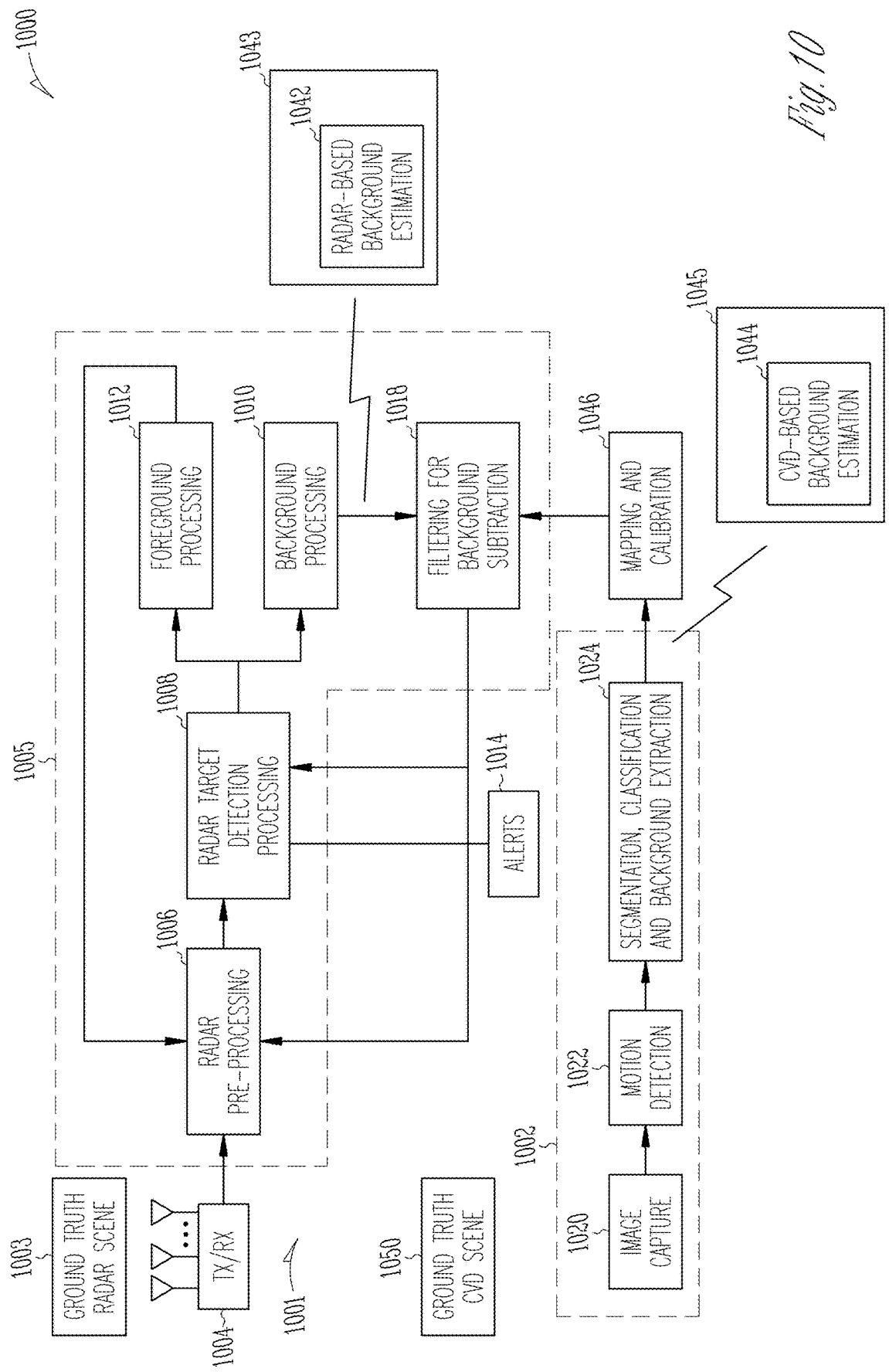
FIG. 10 is an illustrative block diagram showing an example second spatial sensor system in which a radar-based background estimation produced using a radar system and CVD-based background estimation produced using a computer vision device (CVD) are fused and filtered to improve accuracy.

FIG. 10 is an illustrative block diagram showing an example second surveillance system 1000. The second surveillance system 1000 includes a first sensor that comprises a radar system 1001 and includes a second sensor that comprises a computer vision device (CVD) 1002. The second surveillance system 1000 uses image motion detected within the CVD 1002 to improve detection accuracy of radar target detection within the radar system 1001. The surveillance system 1000 includes the radar system 1001, the CVD 1002, a mapping and calibration module 1046, and a filtering module 1018. The radar system captures and processes radar data. The image system captures image information and produces and processes image data. The mapping and calibration module 1046 matches radar locations within the radar scene 1003 with CVD locations within a CVD scene 1050. An example mapping and calibration module 1046 uses a homography transformation as explained above with reference to FIGS. 9A-9B. The filtering module determines in real-time, whether to filter a radar background object, based at least in part upon whether image motion is detected for an image ROI at a corresponding CVD ground truth location.

The first sensor 1002 comprises a radar system that includes TX/RX units(s) 1004 and a radar processing pipeline 1005 that includes a radar pre-processing module 1006, a radar target detection module 1008, a radar background estimation module 1010, and a radar foreground activity pattern detection module 1014. The radar target detection module 1008 is operatively coupled to a real-time alerts system 1014. Operation of the modules 1006, 1008, and 1012 of the radar processing pipeline 1005 and operation of the alerts system 1014 will be understood from the above disclosure of the radar processing pipeline AA02 of FIG. 1. Moreover, the radar background estimation module 1010 produces a radar-based background estimation 1042, stored in a non-transitory storage device 1043, as described above with reference to FIG. 1. However, instead of relying on background masks to overcome detection problems such as background object radar clutter, the second surveillance system 1000 fuses motion detection detections/non-detections at corresponding locations of the radar-based background estimation 1042 and the CVD-based background estimation 1044, to improve radar sensor accuracy and reduce false positives.

The second sensor comprises a computer vision device (CVD) 1020 that includes. The image capture module 1020 captures 2D image frames at an image plane (not shown) from a 3D CVD scene 1050. The motion detection module 1022 detects object motion to identify image regions of interest (ROIs) within the image information. The segmentation and classification module 1024 segments and classifies image objects to create a CVD-based background estimation 1044, stored in a non-transitory storage device 1045. An example segmentation and classification module 1024 can use deep learning CNN-based algorithms to perform segmentation and classification.

The filtering module 1018 fuses real-time image motion detection by the CVD 1020 at a location in the CVD-based background estimation 1044 with real-time radar detection at a corresponding location in the radar-based background estimation 1042 to determine whether to subtract a background object from the corresponding location in the radar-based background estimation 1042. The filtering module 1020 is coupled to receive radar background estimation information 1042 from the radar background estimation module 1010 and to receive CVD background estimation information 1044 from the CVD background extraction module 1024. More particularly, the filtering module 1018 receives the CVD background estimation information 1044 via the mapping and calibration module 1046, which maps between a CVD-based scene coordinates and radar-based scene coordinates. An example filtering module 1018 can use deep learning CNN-based algorithms to perform segmentation and classification.

Figure 11:
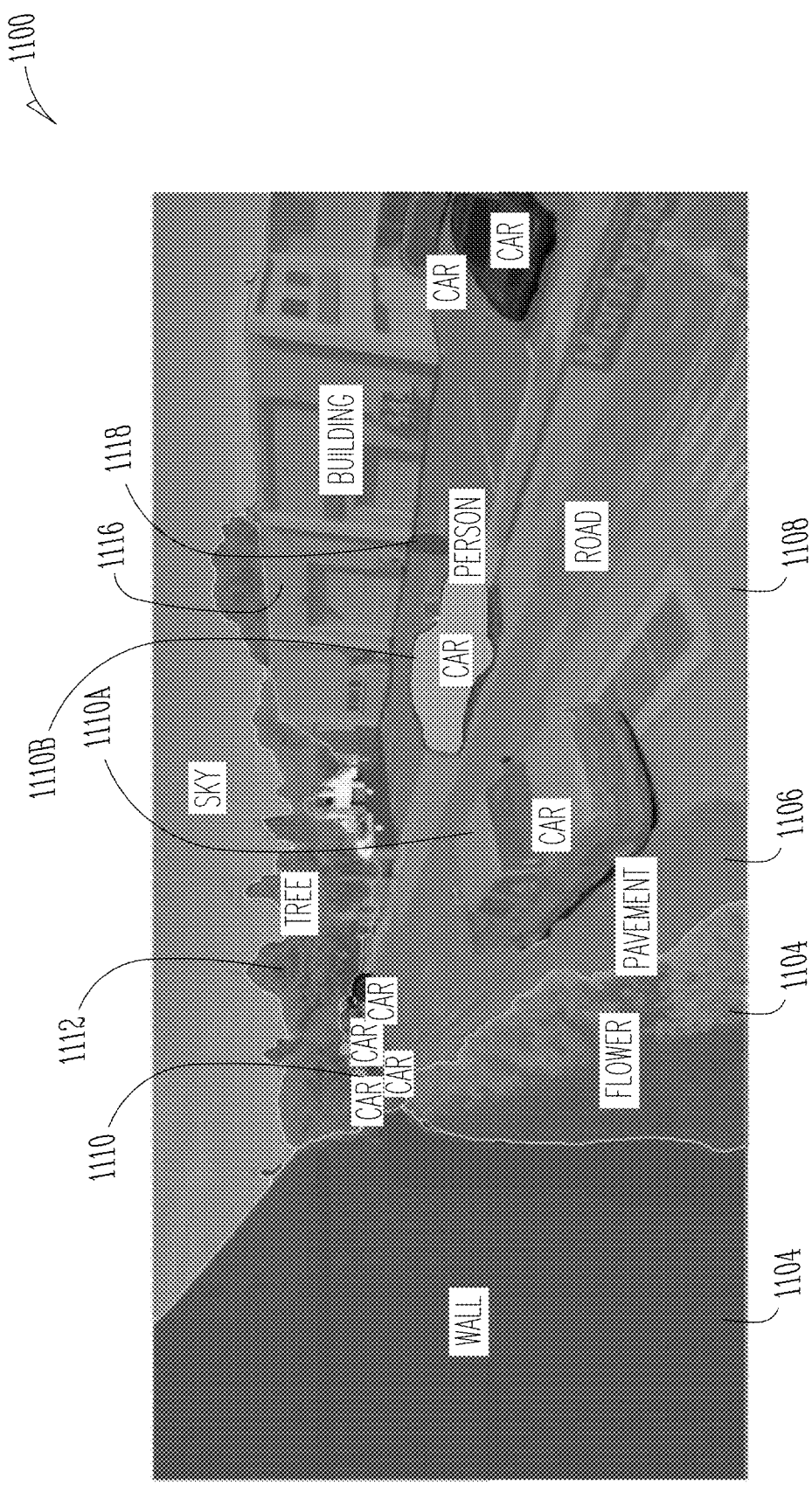
FIG. 11 is an illustrative drawing showing an example CVD background estimation information that includes semantic segmentation and labeling.

FIG. 11 is an illustrative drawing showing an example CVD background estimation information 1100 that includes semantic segmentation and labeling (classification). It will be understood that in vision/imaging systems, background estimation is commonly referred to as "semantic segmentation". The background estimation information includes segment 1108 labeled wall, segment 1104 labeled flower, segment 1106 labeled pavement, segment 1108 labeled road, numerous segments labeled 1110 labeled car. A segment 1110A labeled car also is labeled with a confidence score 93%. A segment 1110B labeled car also is labeled with a confidence score 81%. A segment 10C labeled car also is labeled with a confidence score 99%.

It will be understood that semantic segmentation networks in computer vision can provide accurate locations and labels of background objects in the scene based on appearance. For example, using semantic labeling accurate shape and location of a road in a scene can be shown relative to other background objects. In addition, an accurate model of the background can be built using the combination of semantic segmentation, detection, and depth estimation through stereo or mono depth estimation methods. Deep learning CNN-based algorithms can be used to perform segmentation and classification.

Filtering Radar Background

Referring again to FIG. 10, the filtering module 1018 selects from among radar background estimation information 1042 and CVD background estimation information 1044 to filter radar pipeline parameters, e.g., to adjust a PSNR threshold. In a simplest case filtering module 1018 can select (based on prior knowledge or real-time information from scene) ONE of the background inputs it receives to use for final background estimation (e.g., radar background, or vision segmentation/background estimator).

Figure 12A:
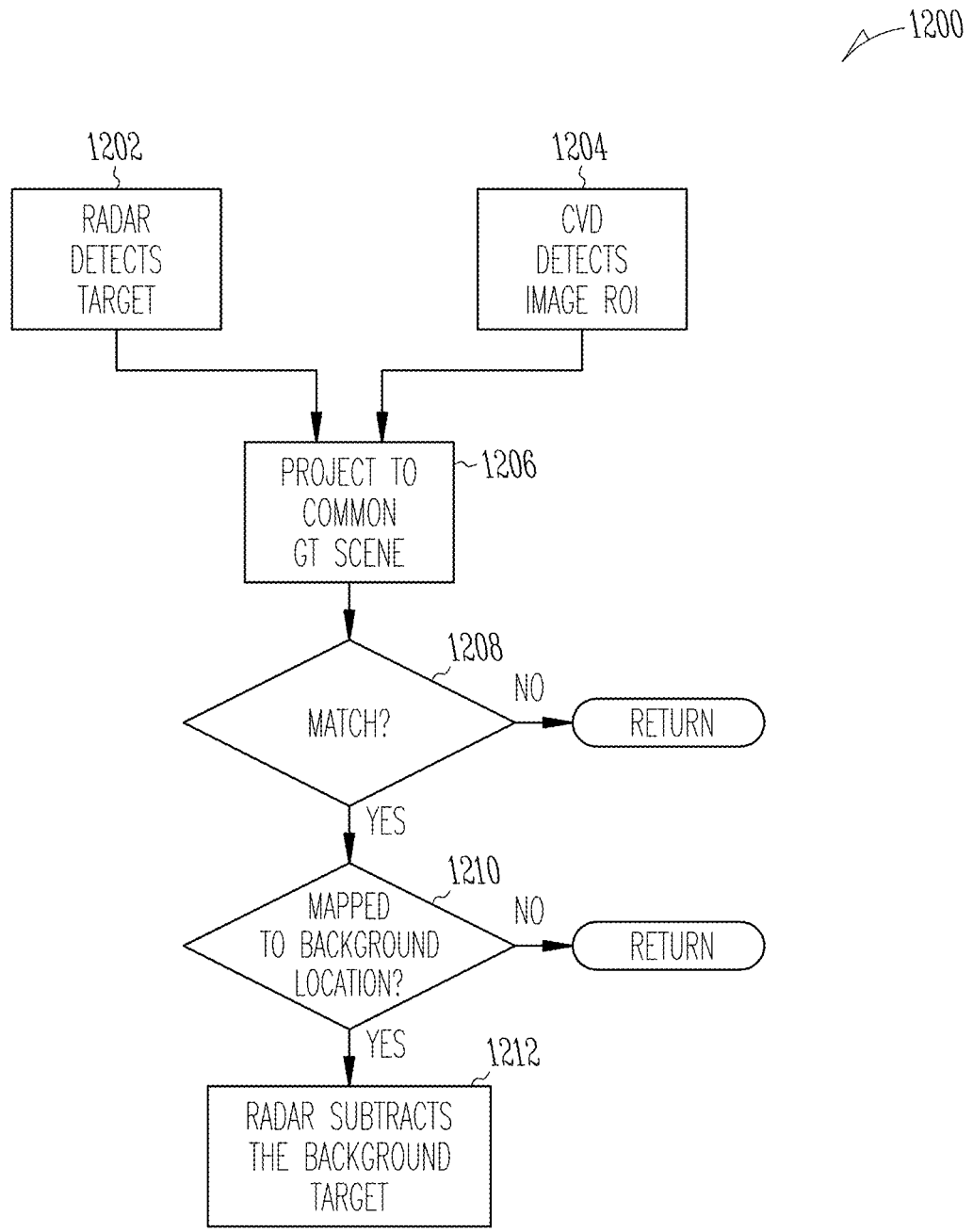
FIG. 12A is an illustrative flow diagram of an example first background subtraction filtering method, based upon motion fusion.

FIG. 12A is an illustrative flow diagram of an example first background subtraction filtering method 1200 based upon motion fusion. One or more processor circuits of the radar system 1005, of the CVD 1002, the filtering module 1018 and the mapping and calibration module 1046, are specially configured according to computer executable instructions to implement the operations of the method 1200. At operation 1202, radar 1201 detects a real-time radar target track. At operation 1204, CVD 1202 detects a real-time image ROI, which is in motion. At operation 1206, projects the radar target track scene location and image ROI vision scene location to a common scene. An example projection can involve either projecting the image ROI location in the vision scene 1050 to the radar scene 1003, or projecting radar target track in the radar scene 1003 to the CVD scene 1050. Operation 1208 determines whether mapped-to locations of the radar target and the image ROI match within the common scene. In response to no match, the process ends. In response to a match, operation 1210 determines whether either the radar target or the image ROI is mapped to a location in a background estimation (either radar-based background 1242 or the CVD-based background estimation 1244). In response to a determination that mapping is to a location in a background estimation, at operation 1212, radar subtracts the background target.

Figure 12B:
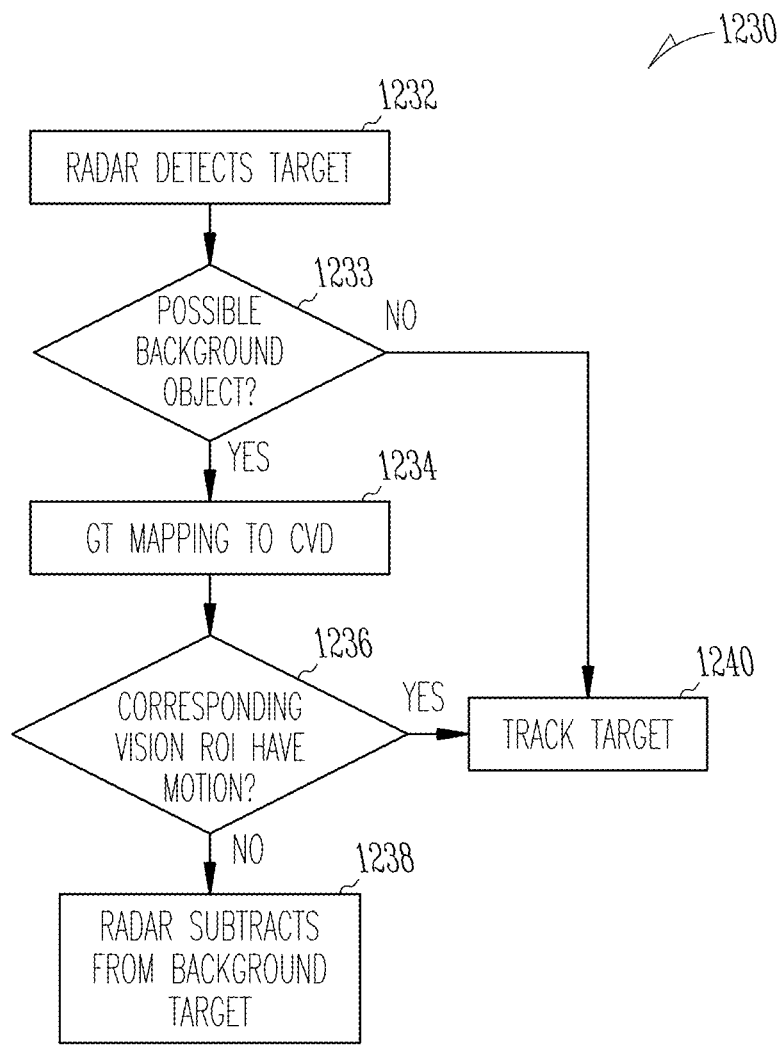
FIG. 12B is an illustrative flow diagram of an example second background subtraction filtering method, based upon a radar priority pipeline.

FIG. 12B is an illustrative flow diagram of an example second background subtraction filtering method 1230, based upon a radar priority pipeline. One or more processor circuits of the radar system 1005, of the CVD 1002, the filtering module 1018 and the mapping and calibration module 1046, are specially configured according to computer executable instructions to implement the operations of the method 1230. At operation 1232, the radar target detection module 1008 detects and extracts a target track, also referred to as radar region of interest (ROIs). At operation 1233, the radar target detection module 1008 determines whether there is sufficient ambiguity as to whether the target is a foreground object or a background object at a location in the radar-based background estimation 1042, to call upon the vision sensor 1002 to indicate whether it has detected an image ROI at a corresponding location in the CVD-based background estimation 1044. For example, there can be ambiguity when a track has a radar location that overlaps a location of a background object. The radar target detection module 1008 may use machine learning techniques including deep learning CNN-based algorithms to determine that there is sufficient ambiguity to call for assistance from the CVD 1002. In response to finding the target is a foreground object, at operation 1240, radar tracks the target. In response to finding sufficient ambiguity, at operation 1234, the mapping and calibration block 1046 uses homography to map the suspected target track location within the radar scene 1003 to a corresponding location in the CVD scene 1050. At operation 1236, CVD 1002 locates a corresponding image ROI in the mapped-to location in the CVD scene 1050 and determines whether the corresponding image ROI has a class that is part of vision scene background. At operation 1238, in response to a determination that by the CVD 1002 that the corresponding image ROI does is a part of vision scene background and does not have image motion, then the radar target detection module 1008 subtracts the detected target; that is, the radar 1001 regards the target as a background object and ignores it. At operation 1240, in response to a determination that by the CVD 1002 that the corresponding image ROI does have image motion, the radar target detection module 1008 tracks the detected target.

Figure 12C:
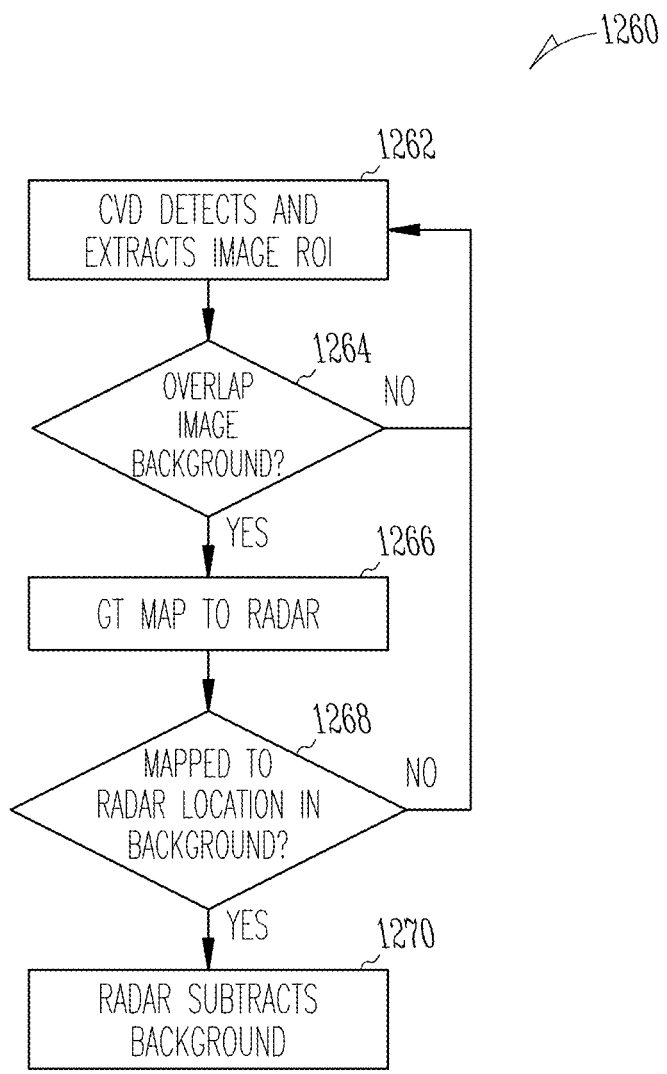
FIG. 12C is an illustrative flow diagram of an example third background subtraction filtering method, based upon a vision priority pipeline.

FIG. 12C is an illustrative flow diagram of an example third background subtraction filtering method 1260, based upon a vision priority pipeline. One or more processor circuits of the radar system 1005, of the CVD 1002, the filtering module 1018 and the mapping and calibration module 1046, are specially configured according to computer executable instructions to implement the operations of the method 1260. At operation 1262, the CVD 1002 performs image motion detection and extracts an image ROI that has image motion. At operation 1264, the CVD 1002 determines whether the extracted image ROI overlaps with the current CVD-based background estimation 1044. The overlap determination can depend upon whether the image ROI overlaps vision segmentation and classification indicative of a background object (e.g., a tree), or the image ROI overlaps vision segmentation and classification indicative NOT a background object (e.g., person). In response to a determination that NO overlap exists with a background object, the process 1260 returns to vision motion detection operation 1262. In response to a determination that DOES overlap with a background object, at operation 1266, the mapping and calibration block 1046 uses homography to map the detected image ROI in the CVD scene 1050 to a corresponding location in the radar scene 1003. Operation 1268 determines whether the corresponding mapped-to radar location is within the radar-based background estimation 1042. At operation 1270, in response to a determination that the mapped-to radar location is in the radar-based background estimation 1042, the radar system 1002 subtracts the background at the mapped-to location. That is, a detection threshold in the radar target track detection module 1008 is adjusted to not detect a target track at the mapped-to radar location. In response to a determination that the mapped-to radar location is not in the radar-based background estimation 1042, the process returns to operation 1262.

Radar Ghost Target Removal

Figure 13:
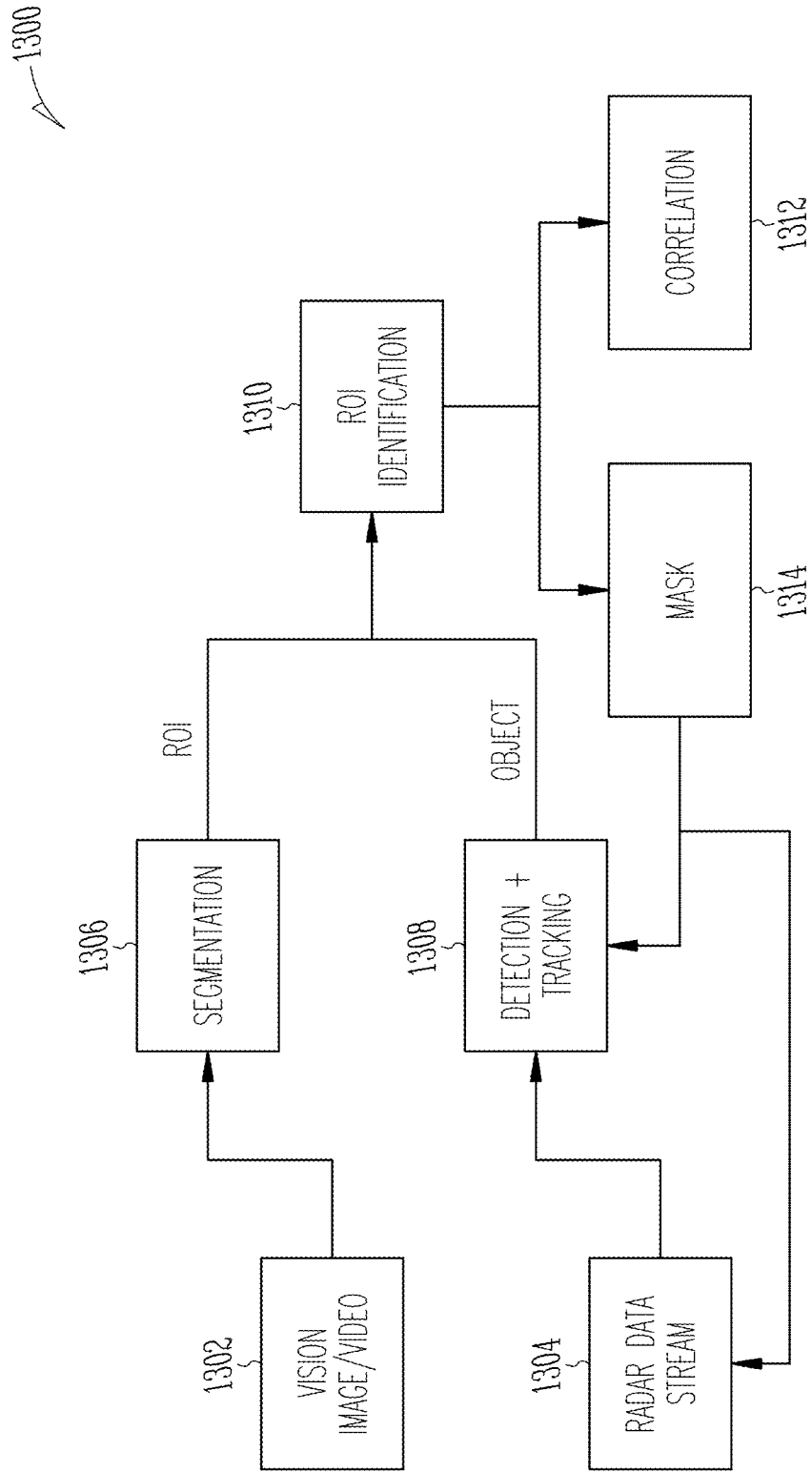
FIG. 13 is an illustrative block diagram representing a spatial sensor system MM00 configured for ghost image removal.

FIG. 13 is an illustrative block diagram representing a spatial sensor system 1300 configured for ghost target track removal. A ghost target track can occur due to reflections of radar data within a radar scene. A portion of backscatter radar data reflected from a target may reflect off another radar reflector in a radar scene before reaching a Tx/Rx radar unit. The result can be a real radar target detected based upon radar data reflected directly from the target to the Tx/Rx radar unit and a (false) ghost radar target detected based upon radar data first reflected from the target and then reflected off another reflector before arriving at the Tx/Rx radar unit. This creates a problem of discerning and removing ghost radar target tracks. The third spatial sensor system 1300 includes a CVD sensor 1302, a radar sensor 1304, an image segmentation module 1306, a radar detection and tracking module 1308, an image ROI identification module 1310, a correlation module 1312 and a mask module 1314. In operation, the CVD sensor 1302 produces image data based upon image information received from a CVD scene (not shown) in a 3D world view (not shown). The radar sensor 1304 receives radar data from a radar scene (not shown) in a 3D world view. The CVD scene and the radar scene overlap. The image segmentation module 1306 uses the image data to produce and store in a hardware memory, a CVD background estimation (not shown) that includes semantic segmentation and labeling (classification). FIG. 11 discloses an example background estimation that includes semantic segmentation and labeling. The radar detection and tracking module 1308 detects and tracks target objects.

The segmentation module 1306 and the detection and tracking module 1308 capture information used by the image ROI identification module 1310 to determine whether motions of a pair of radar target tracks are correlated and to produce a binary mask to filter out a ghost radar target track. The radar detection and tracking module 1308 contemporaneously detects and tracks a pair of real-time target tracks. The ROI identification module 1310 causes the correlation module 1312 to determine whether motion of the target tracks is correlated. A determination as to whether the motions of the pair of radar target targets is correlated can be determined, for example, based upon similarity of their Doppler signatures and/or similarity of their target track trajectories for example. The radar detection and tracking module 1308 can use deep learning CNN-based algorithms to determine whether a pair of target tracks have correlated motion. The ROI identification module 1310 causes the mask module 1312 to determine a binary mask for use to filter out the ghost radar target track. The ghost radar target track can be determined based upon segmentation information produced using the segmentation module 1306, which indicates proximity of geometric location of different vision objects within a vision scene. A pair of targets that are located too distant from one another in the vision scene are determined to not be a correlated pair to be subjected to filtering. The ROI identification module 1310 can use deep learning CNN-based algorithms to determine the binary mask.

The background segmentation information produced and stored using the image segmentation module 1306 provides information as to location of each target track of a pair of radar target tracks relative to objects in the CVD scene. The mask module 1314 determines one of the target tracks from a correlated pair determined to be a ghost, based upon its location relative to one or more objects represented in the semantic segmentation information. An object of a correlated pair that would be blocked from view by one or more objects in the semantic segmentation information is determined to be a ghost object. For example, if a semantic segmentation object represents a wall, and one of target track of a correlate pair of target tracks is located in front of the wall and the other is located behind the wall (within the CVD scene), then the target track located behind the wall is determined to be the ghost and is masked/subtracted from the radar detection. The mask module 1314 creates a binary mask to use to cause one or both of the radar sensor 1304 and the radar detection and tracking module 1308 to mask the radar ghost object. The mask module 1314 can use deep learning CNN-based algorithms to identify correlated target tracks and to identify regions where target tracks always are correlated.

Smart Alerts

Figure 14:
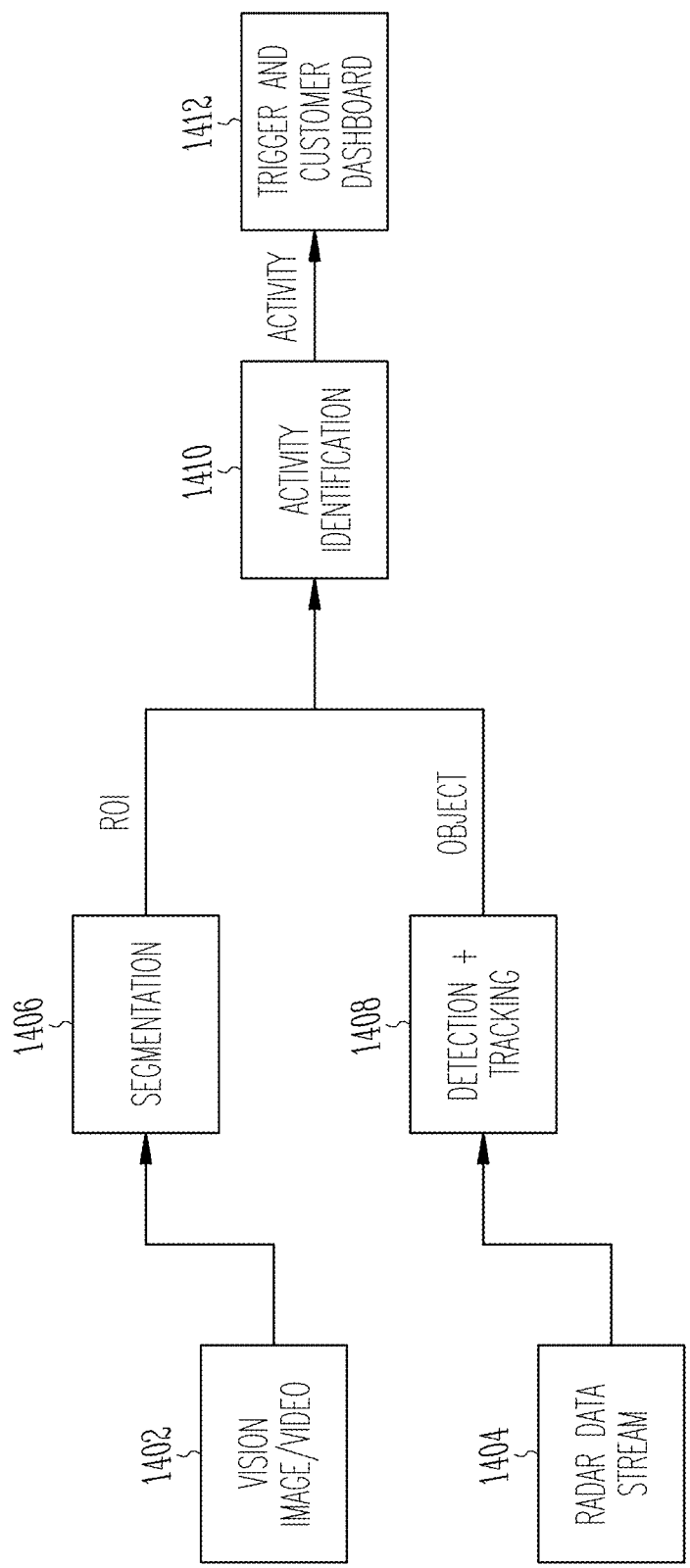
FIG. 14 is an illustrative block diagram representing a fourth spatial sensor system NN00 configured to use activity identification to trigger smart alerts.

FIG. 14 is an illustrative block diagram representing a fourth spatial sensor system 1400 configured to use activity identification to trigger smart alerts. The third spatial sensor system 1400 includes a CVD sensor 1402, a radar sensor 1404, an image segmentation module 1406, a radar detection and tracking module 1408, an activity identification module 1410 and an alerts module 1412. Operation of the CVD sensor 1402, a radar sensor 1404, an image segmentation module 1406, a radar detection and tracking module 1408 will be understood from the explanation above with reference to FIG. 13 and for conciseness of disclosure, will not be repeated. The activity identification module 1410 can use deep learning CNN-based algorithms to identify an activity that merits triggering the alerts module 1412, which issues an alerts based upon input from the activity identification module 110. For example, an image ROI may include a segmentation labeled as a fence, and the Doppler measurements and micro Doppler measurements associated with a radar target track may indicate that the target track is person who crossed over (jumped) the fence. The activity identification module AA10 determines whether an association between a semantically labeled segmentation and activity of a target track warrants a triggering an alert.

Initial Scene Estimate with Geometry Measurements and Object Classifications

Figure 15:
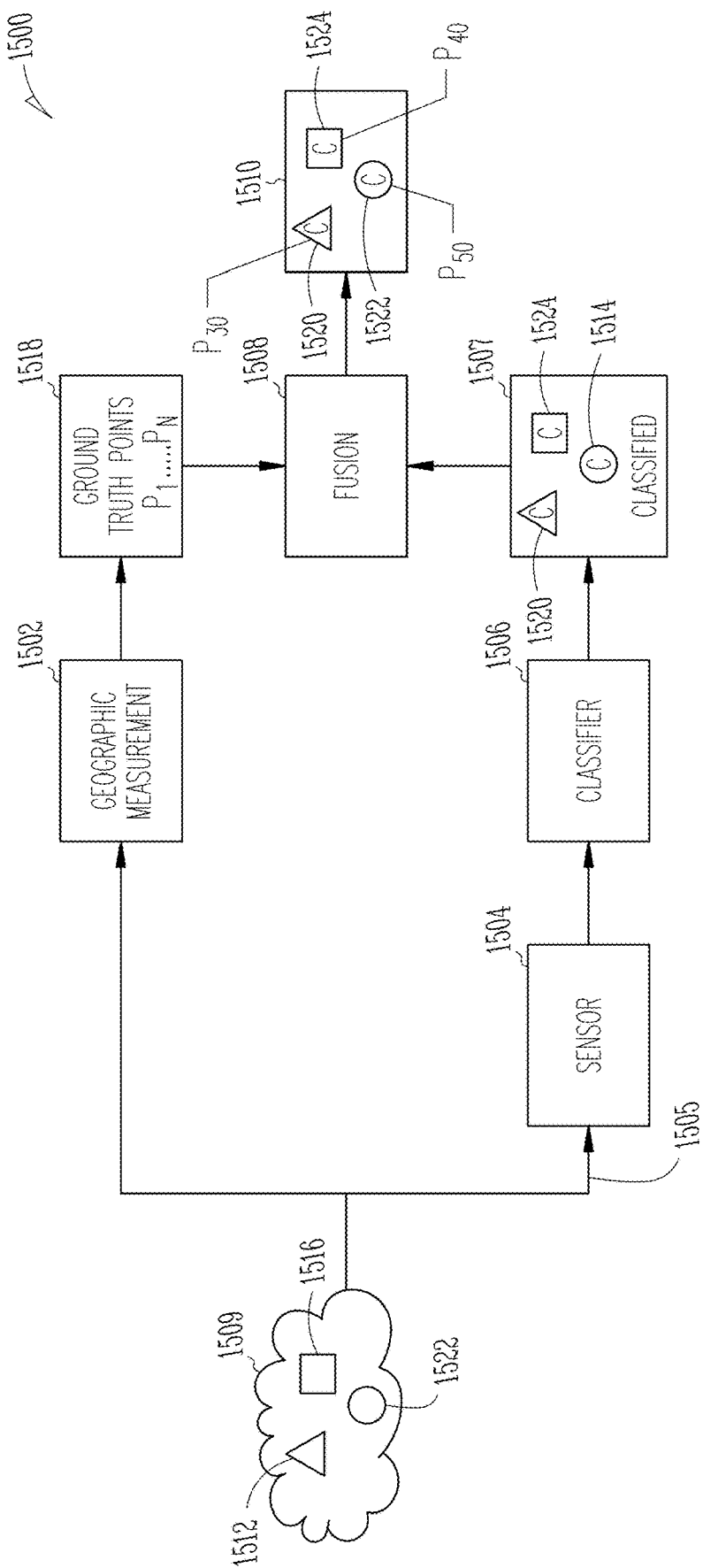
FIG. 15 is an illustrative block diagram of an example scene initialization machine.

FIG. 15 is an illustrative block diagram of an example scene initialization machine 1500. The scene initialization machine can be incorporated in the spatial sensor system 100 of FIG. 10, for example. The scene initialization machine 1500 includes a scene geometry measurement module 1502, a sensor 1504, a classifier module 1506, and a fusion module 1508. As used herein, a "scene" comprises three-dimensional (3D) real-world region within a field of view of the scene sensor. The scene geometry measurement module 1502 provides real-world geometric three-dimensional information 1503 that includes location points P1, ..., Pn, of physical real-world objects located within the real-world scene 1509. As explained more fully below, for a multi-sensor system that uses a vision/image sensor and a radar sensor, the geometry information 1503 is used to map both radar estimates and vision/image classifications to a common space where they can be associated. Because a vision/image sensor senses the real world in two dimensions (2D) and in color, while a radar sensor senses the real world in three-dimensions (3D), a real world geometry map is produced to associate measurements sensed using the two sensors to a common coordinate system or world space so that each sensor (vision and radar) can be used to assist the other in making more accurate detections and estimations (radar) and/or classifications (vision).

The sensor 1504 senses sensor stimulus signal information 1505 emanating from the scene 1509. The scene classification module 1506 classifies physical objects 1512, 1514, 1516 sensed within the scene 1509 to produce multiple corresponding classifications 1507, including classified objects 1520, 1522, 1524. The fusion module 1508 fuses the geometric position measurements P1, . . . . Pn, with the classified objects 1520, 1522, 1524 to produce an initial scene estimate map 1510 of the scene 1509 that includes multiple ones of the position measurement points P1, . . . , Pn, associated with classified objects 1520, 1522, 1524.

An example scene geometry measurement module 1508 obtains positions of locations within the scene 1509 relative to the sensor 1504. The geometry measurement module 1502 can include a vision device. For example, the CVD 1002 of FIG. 10 can be used as the geometry measurement module 1502, to scan the entire scene 1509 to measure distance between the image capture device 1020 and point locations in the scene. Alternatively, for example, the geometry measurement module 1502 can include a high-resolution radar. For example, the radar system 1001 of FIG. 10 can be used to scan the entire scene to measure distance between the radar receive antennas 1018 and point locations in the scene. Thus, sensor 1504 may play a dual role of performing geometric measurements and sensing sensor stimulus to collect sensor data for use in classification. As another alternative, the geometry module can include a Lidar detector.

An alternative example geometry measurement module 1502 obtains ground truth (GT) positions of locations within the scene. The GT positions are absolute positions within the scene, not relative positions. For example, the geometry measurement module 1502 can include the calibration setup 900 of FIG. 9A where the sensor 1504 is one of the sensors the system 901 of FIG. 9B. The GT positions described with reference to FIGS. 9A-9B are absolute (not relative) positions of locations within the scene 1509. As explained with reference to FIGS. 9A-9B, GT point locations are determined based upon GPS measurements are used to create a homography transform that correlates the GT associate location points in a radar sensor scene 908 to the vision sensor scene 910. Thus, GT point locations are known throughout both a radar sensor scene 908 to the vision sensor scene 910.

The sensor 1504 can include the radar system 1001 and/or the image capture device 1001 of FIG. 10. The sensor stimulus includes RF energy in the case of radar and includes light energy in the case of an image capture device. Alternatively, the sensor 1504 can include any one or more of multiple different sensor types such as, an inertial measurement unit (IMU) unit, RGB Camera, depth sensor, IR camera (or RGBI), Thermal Camera, or ultra-wideband (UWB) sensor.

The classification module 1506 can include one or more of a background mask classification module, a foreground classification module, and a segmentation module. More particularly, for an initialization module that uses radar as the sensor, the classification module 1506 can include background classification module 1010 and a foreground classification module 1012 of FIG. 10. For an initialization module that uses vision as the sensor, the classification module 1506 can include the segmentation, classification and background classification module 1024 of FIG. 10. The segmentation, classification and background classification module 1024 segments and classifies vision objects to create a vision background of the vision scene 1050 that includes classified vision segments.

The fusion module 1508 fuses measured geometric positions 1503 produced using the geometry measurement module 1502, with classifications 1510 produced using the classifier 1506, to generate the initial scene estimate initial scene estimate map 1510. More specifically, the fusion module 1508 associates the geometric positions 1503 with background classifications 1510 using a score metric such as euclidean distance between the two estimates. The fusion can also be based on a combination of score metric and additional heuristics such as the estimated surface area for known background objects such as cars. An output signal of the fusion module 1508 includes the initial scene estimate map 1510 map that geometric positions 1503 with classifications that have been closely associated based on the score metric and heuristics.

Referring again to FIG. 10, the initial scene estimate map 1510 provides a highly trustworthy initial estimate of static background for respective sensing domains. An instance of the scene initialization machine 1500 in which the sensor is the radar sensor 1001 is used to create an initial scene instance of the radar-based background estimation map 1042. An instance of the scene initialization machine 1500 in which the sensor is the CVD sensor 1002 is used to create an initial scene instance of the CVD-based background estimation map 1044.

Accuracy of the radar-based background estimation map 1042 and accuracy of the CVD-based background estimation map 1044 improve over time as additional scene-related data is collected. Still referring to FIG. 10, over time, the radar system 1001 regularly samples RF radar data to capture instantaneous radar measurements to update the radar-based background estimation map 1042. based upon improved classifications of detected radar objects. Likewise, over time, the CVD 1002 regularly samples image data to capture instantaneous light image data measurements to update the CVD-based background estimation map 1044, based upon improved classifications of detected image objects. Machine learning techniques including deep learning CNN-based algorithms can be used to classify detected objects and to update the classifications based upon semantic information, which can be a combination of temporal, spatial and/or sensor specific.

An example background estimation map e.g., 1042 or 1044, includes a spatial occupancy classification information layer (not shown). The spatial occupancy classification layer provides classification information indicating space in a scene occupied by classified objects. The spatial occupancy layer can indicate permanent objects (e.g., trees, building, fence) and can indicate variable occupancy (e.g., cars in a parking space). Instantaneous measurements are used to update the occupancy layer, especially for variable occupancy.

An example background estimation map, e.g., 1042 or 1044, includes a temporal classification information layer (not shown). The temporal classification layer provides classification information indicating time scale associated with classified objects. The temporal classification layer provides classification information indicating long time scale (e.g., days) for more persistent objects such as buildings, parking lot, fence. The temporal classification layer provides classification information indicating short time scale (e.g., minutes/hours) for more transitory objects such as parked cars, shaking trees, shaking fence. Long time scale classification objects can subtracted permanently using location information, however short time scale classification objects are continuously updated.

A classification system can use sensors to clearly separate foreground information from background information. For example, the system 100 of FIG. 10 can include a thermal sensor (not shown) that can be used to detect humans and animals and identify them as foreground objects, rather than background objects, based upon thermal signature.

Trajectory Database

A radar system e.g., 101, 1001, detects trajectories that contain information about foreground target movement patterns in a radar scene e.g., 103, 1003. Trajectory information can include, for example, car trajectories that cover drivable region, such as a road. Trajectory information can include, for example, people trajectories that cover walkable region, such as crosswalks, and sidewalks. An individual target provides a single trajectory. Numerous trajectories are required to identify activity patterns. A trajectory database is provided to aggregate large numbers of trajectories to have sufficient trajectory information to learn patterns of target activity, either vehicles or persons for example. The trajectories can be mined and evaluated to identify activity patterns. These activity patterns can be accessed using a radar foreground activity pattern detection module e.g., 112, 1012 for use to cause radar pre-processing 106, 1006 and/or radar target detection module 108, 1008, such as abnormality detection, false positive detection.

Figure 16:
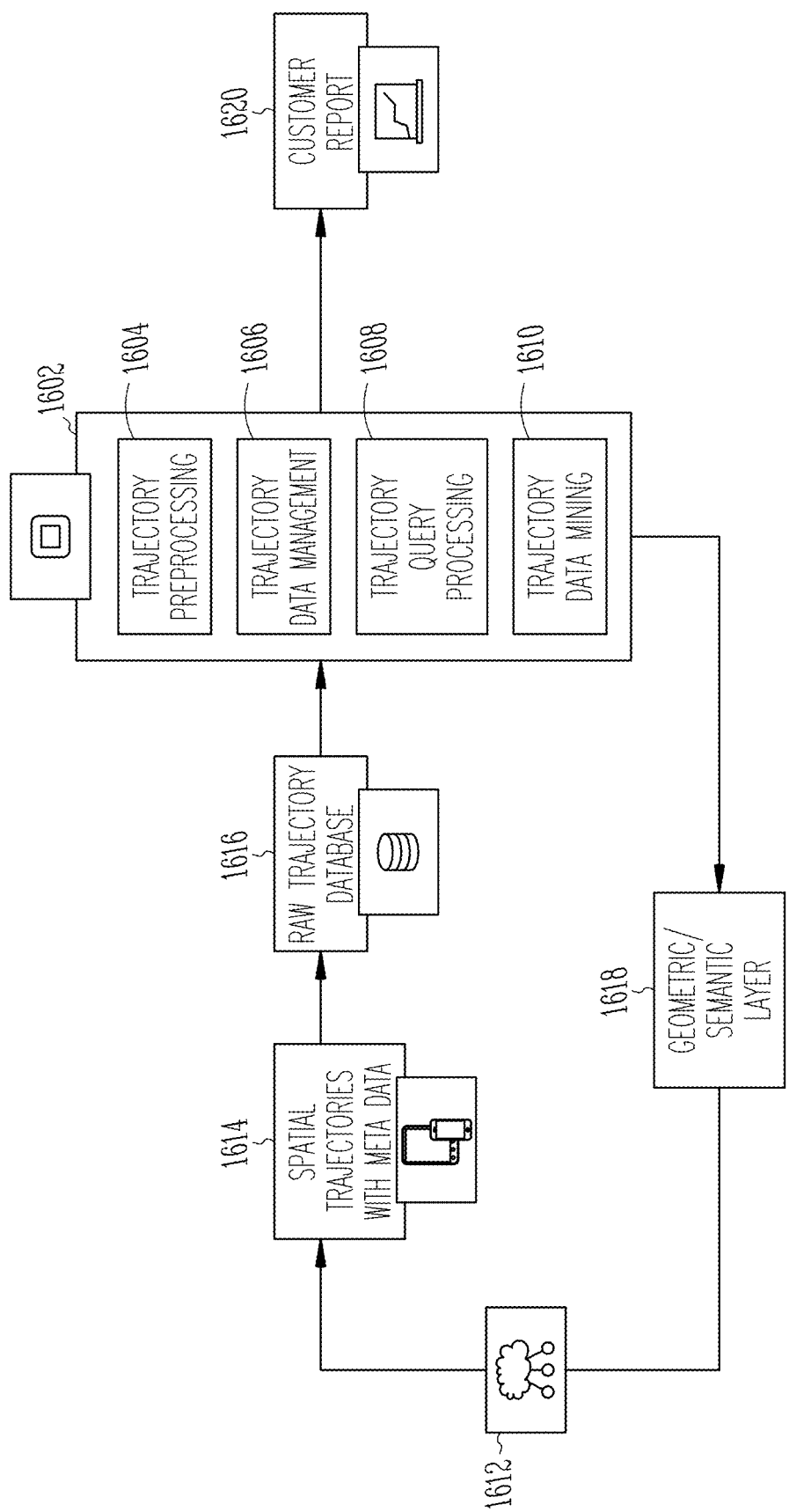
FIG. 16 is an illustrative diagram representing an example trajectory database.

FIG. 16 is an illustrative diagram representing an example trajectory database 1600. The database includes a compute module 1602. The compute module P002 includes a trajectory pre-processing module 1604 that cleans noisy trajectory information such as by filtering received trajectory information to remove certain information. A trajectory management module 1606 manage trajectory storage. It will be understood that a spatial sensor system 100, 1000 can generate terabytes of information per month to be managed. Trajectory query processing module 1608 provides query access to administrator (not shown) and to foreground activity pattern detection modules 112, 1012 so that select information can be accessed and extracted, e.g., only persons walking or only cars driving. Trajectory data mining module 1610 uses machine learning techniques including deep learning CNN-based algorithms to determine what information can be mined from aggregated trajectories stored in non-transitory machine-readable storage the database 1600.

The trajectory database is coupled to a spatial sensor system e.g., 100, 1000 over a network 1612. Spatial trajectories with metadata input module 1614 are coupled to the network 1612 to receive trajectory data and associated metadata from a spatial sensor system e.g., 100, 1000. The received spatial trajectories with metadata are provided to a raw trajectory database 1616, which is accessed by the compute module 1600 for storage, analysis, and use as described above. A geometric semantic layer module 1618 is coupled to provide access over the network 1612 to the compute module 1600. The foreground activity pattern detection modules 112, 1012 can access trajectory data from the compute module 1600 via geometric semantic layer module 1618. The compute module 1600 provides administrator information via customer report module 1620.

Background Estimation Processing in the Cloud

Figure 17:
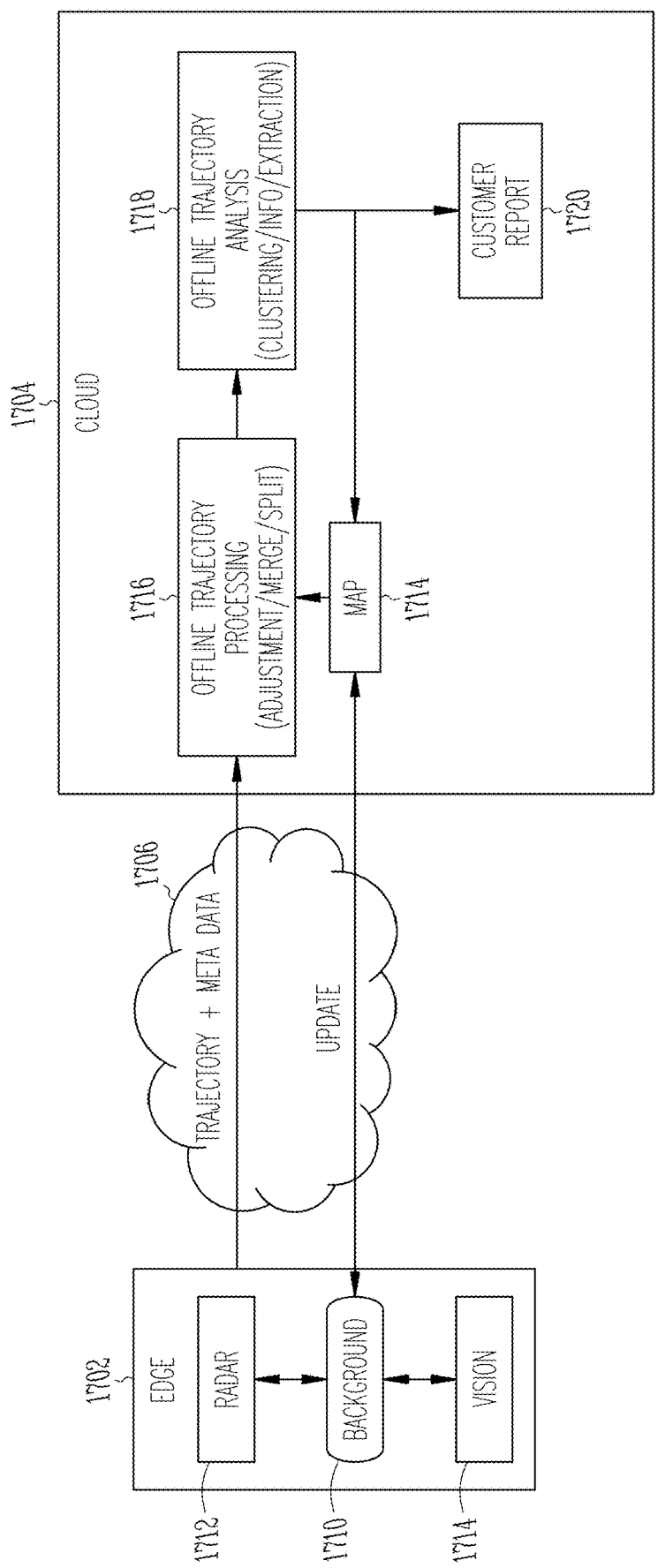
FIG. 17 is an illustrative schematic diagram showing a first example spatial sensor computing machine in which background estimate processing is performed in the cloud.

FIG. 17 is an illustrative schematic diagram showing a first example spatial sensor computing machine 1700 in which background understanding processing is performed in the cloud. The term "cloud" as used herein, refers to a geographically distributed set of multiple machines configured to function as a single server. Background understanding processing refers to processing to evaluate and classify sensor information to update background estimation of a scene. Background understanding processing in the computing machine 1700 involves processing to update both radar-based background estimation information and CVD-based background estimation information.

The computing machine 1700 includes an edge machine 1702 and a cloud machine 1704 coupled to communicate over a network 1706 such as the Internet. A background estimation map 1708 that includes radar and image radar background and image background estimation information is stored in non-transitory machine-readable storage at the cloud machine 1704. An edge processing module 1710 pulls a most recent background estimation from the background estimation map 1708. An edge radar sensor 1714 provides radar data to the edge processing module 1710 for processing. An edge vision sensor 1714 provides vision data to the edge processing module for processing. The edge processing module 1710 processes the radar data and vision data and periodically sends sample radar data, sample image data, trajectory data and associated metadata, and activity data, and events data, over the network 1706 to the cloud machine 1704.

At the cloud machine 1704, an offline trajectory processing module 1716 and an offline trajectory analysis module 1718 cooperate to Maintain an evolving estimate of the background estimation map 1708 (along with estimate confidence), with input from deep segmentation of incoming raw footage and difference analysis, temporal function on estimate trust, and when provided, manual input through user application. A customer report module 1720 produces reports.

Figure 18A:
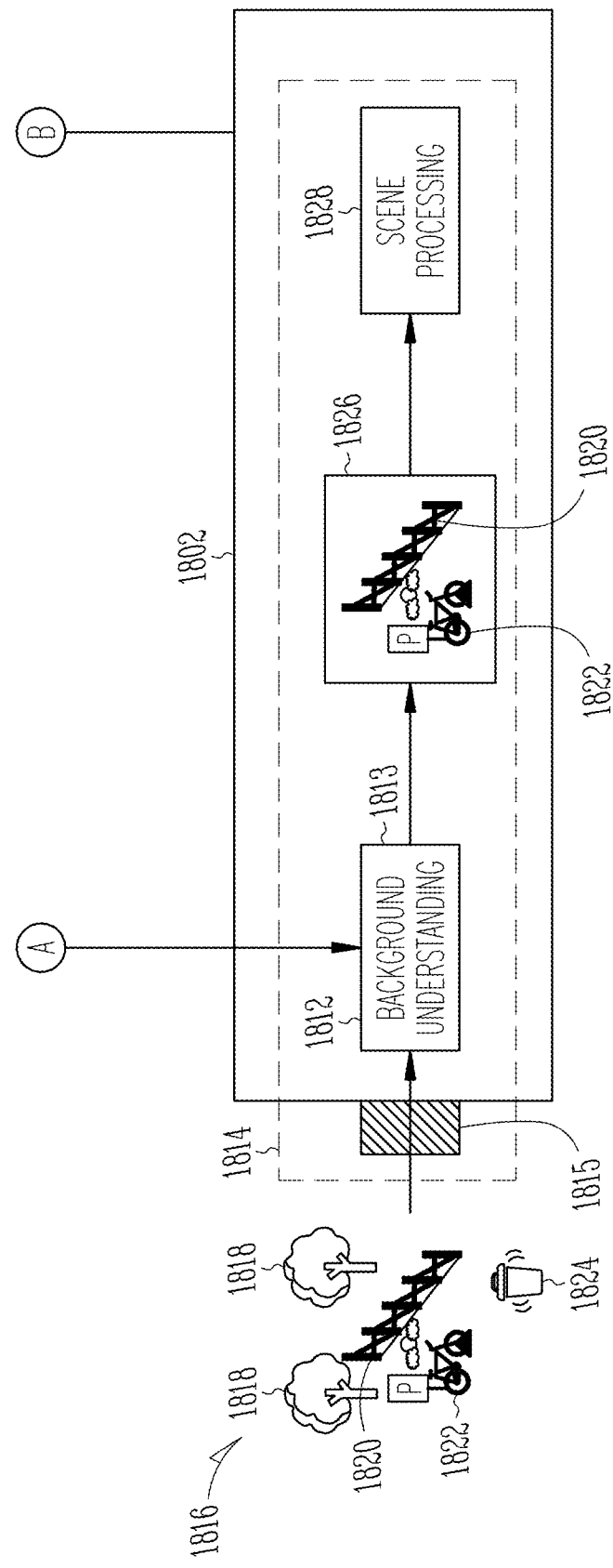
FIGS. 18A-18B are illustrative schematic diagrams showing a second example spatial sensor machine in which background estimate processing is performed in the cloud.
Figure 18B:
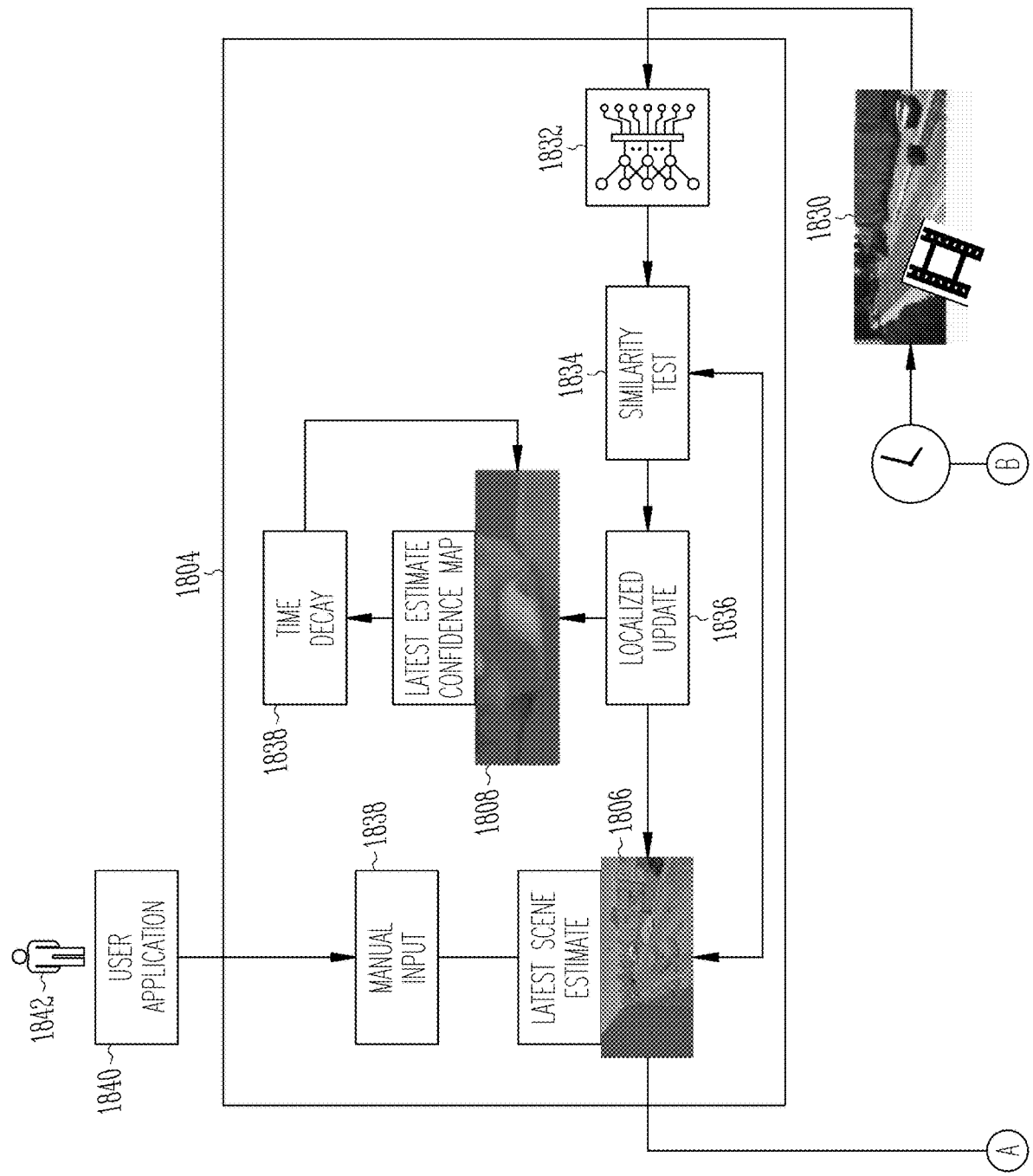

FIGS. 18A-18B are an illustrative schematic diagram showing a second example machine 1800 in which background understanding processing is performed in the cloud. For simplicity of illustration, FIGS. 18A-18B only shows vision images/estimates. However, the computing machine and related processes are applicable to vision, radar, or a fusion of the two—where the image and segmentation/confidence maps would simply be replaced by their equivalent across the specific (potentially fused) domain. A current latest CVD-based background estimate 1806 and a corresponding current estimated confidence map 1808 are generated and stored in non-transitory machine-readable storage at the cloud machine 1804. The computing machine 1800 includes an edge machine 1802 and a cloud machine 1804 coupled to communicate over a network (not shown) such as the Internet. The cloud machine 1804 periodically downloads a current version of the CVD-based background estimation 1812 to a background estimation module 1813 the edge machine 1802.

The edge machine includes a CVD 1814 that includes an imaging device 1815 configured to sense image information emanating from a CVD scene 1816. An example CVD scene 1816 includes trees 1818, fence 1820, bicycle 1822, and a shaking garbage can 1824. The imaging device 1815 captures images from the CVD scene 1816. The background estimation module 1813 removes from the captured scene 1816 the trees 1818 and the shaking garbage can 1824, which in this example, are identified in the current scene estimate 1806 as clutter sources to be removed, and produces a filtered CVD scene 1826. It is noted that in operation, the background estimation module 1812 extracts objects from the CVD scene 1816 of interest (e.g. some fusion of vision and radar estimates), and then filters that set by selecting only those that are not estimated to be background (by a background estimation which similarly can span both radar and vision domains). Scene processing module 1828 performs ROI tracking and other functions upon the CVD scene from which background has been filtered, for outputting CVD information to a user at the edge machine 1802. Module 1830 shows a received CVD image. The edge machine 1802 periodically sends received images, over the network, to the cloud machine 1804.

Background estimation module 1832 processes the captured CVD scene sensor measurements to extract a new background estimate (not shown). An example background estimation module 1832 for the vision domain includes a deep segmentation model that outputs a pixel-wise class/confidence map for the captured CVD scene sensor measurements. A similarity test module 1834 evaluates similarity between the new background estimate produced using the background estimation module 1832 and the current running background estimate 1806 stored in non-transitory machine-readable storage at the cloud machine 1804. Localized update module 1836 subjects regions of the current running background estimate 1806 that are significantly different are subject to a localized update, replacing (or combining by a heuristic) the values in the current running background estimate 1806 with those from the new background estimate (not shown). The localized update module 1836 causes update to the current estimated confidence map 1808. It will be appreciated that most machine learning (ML) models output some form of probability associated with their output prediction. The estimated confidence map 1808 maintains a 'soft' (i.e. probabilistic) confidence map alongside a 'hard' (i.e. foreground vs. background or tree vs. road vs. etc. . . . ) current background estimate 1806. This estimated confidence map 1808 is updated using the probabilistic output of ML models used to produce the current running background estimate 1806, as well as by time-based heuristics 1838 (e.g. decreasing the confidence in a running estimate of a pixel if it has not received a localized update within a prescribed time interval. Moreover, a user 1842 can provide manual input 1838 via a user application 1840 to update the current background estimate 1806.

Deep Segmentation and Comparison

Figure 19:
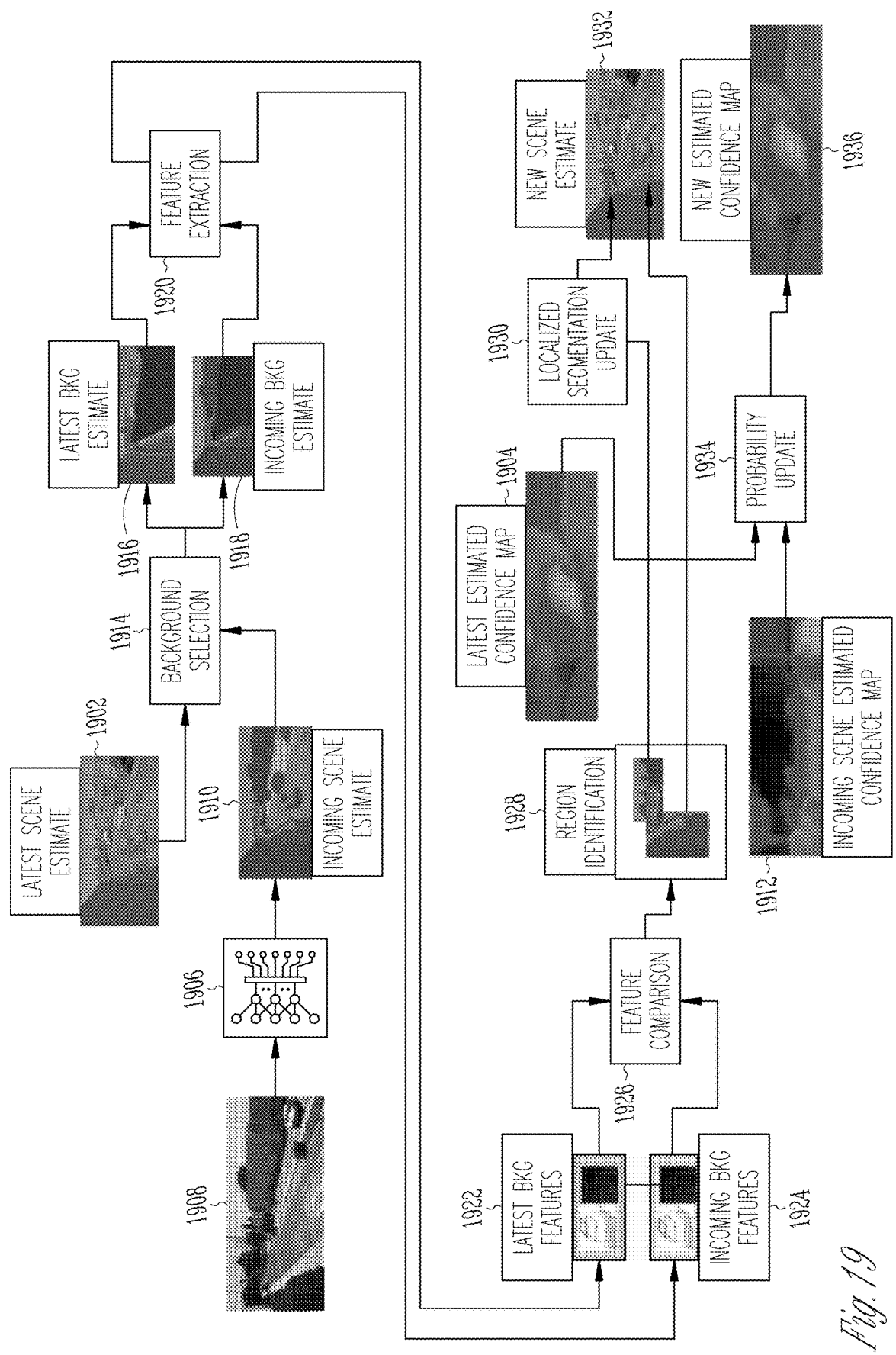
FIG. 19 is an illustrative block diagram representing a spatial sensor computing machine with updating using deep segmentation and comparison.

FIG. 19 is an illustrative block diagram representing a spatial sensor computing machine 1900 with updating using deep segmentation and comparison. For simplicity of illustration, FIG. 19 only shows vision images/estimates. However, the computing machine and related processes are applicable to vision, radar, or a fusion of the two, where the image and segmentation/confidence maps would simply be replaced by their equivalent across the specific (potentially fused) domain. A latest running CVD-based background estimate 1902 and a corresponding current estimated confidence map 1904 are generated and stored in non-transitory machine-readable storage.

A first background estimation module 1906 for the vision domain receives a CVD image 1908 captured at a CVD sensor (not shown). An example background extraction module 1906 includes a deep segmentation model that outputs a pixel-wise incoming CVD scene segmentation 1910 and a corresponding incoming CVD scene confidence map 1912 for the received incoming CVD scene image 1908.

A second background estimation module 1914 receives the latest running CVD-based background estimate 1902 and the incoming CVD scene background estimate 1910. Based in part upon comparison of the CVD-based background estimate 1902 and the incoming CVD scene background estimate 1910, the second background estimation module 1914 removes from the latest running CVD-based background estimate 1902, certain ROIs classified as background to produce a filtered latest running CVD-based background estimate 1916, which is input to a feature extraction module 1920. Similarly, based in part upon comparison of the CVD-based background estimate 1902 and the incoming CVD scene background estimate 1910, the second background estimation module 1914 removes from the incoming CVD scene background estimate 1910, certain ROIs classified as background, to produce a filtered incoming CVD scene background estimate 1918, which is input to a feature extraction module 1920. An example background extraction module 1914 ignores vision ROIs falling in a region classified by a 'background class' (e.g. trees), or radar ROIs with a trajectory resembling a 'background trajectory' (see section on trajectory mining) would be ignored.

For example, the second background estimation module 1914 tries to generate a reliable background estimates within the filtered latest running CVD-based background estimate 1916 and the filtered incoming CVD scene background estimate 1918. Deep learning models that do segmentation do not always generate the background estimates accurately with confidence. For example, if there is a significant amount of shadow in a vision scene during the day, a building might not be classified as a building and instead might be mistakenly classified as a tree due to shadows cast from a tree. In that case using a previous background estimate that has learned over an extended period of time can help verify classifications in a more recent background estimation. Conversely, more recent background classifications can help update previous background classifications.

The feature extraction module 1920 extracts features from the filtered latest CVD-based background estimate 1916, to produce latest running CVD-based background features 1922. The feature extraction module 1920 extracts features from filtered incoming CVD scene background estimate 1918, to produce incoming CVD scene background features 1924. A feature comparison module 1926 compares the latest CVD-based background features 1922 and the incoming CVD scene background features 1924, to identify regions of differences 1928. A localized segmentation update module 1930 subjects regions of the latest scene update estimate 1902 that are significantly different from the incoming CVD scene background estimate 1910, to a localized update, replacing (or combining by a heuristic) the values in the current running background estimate 1902 with those from the incoming CVD scene background estimate 1910, to produce a new scene estimate 1932. A probability update module 1934 updates the latest estimated confidence map 1904 based upon the confidence map 1912 associated with the incoming scene estimate 1910, to produce a new estimated confidence map 1936. For example, a new estimated confidence map can be a linear combination between the latest estimated confidence map and the probability scores that are provided by the machine learning model with the scene estimation.

Figure 20:
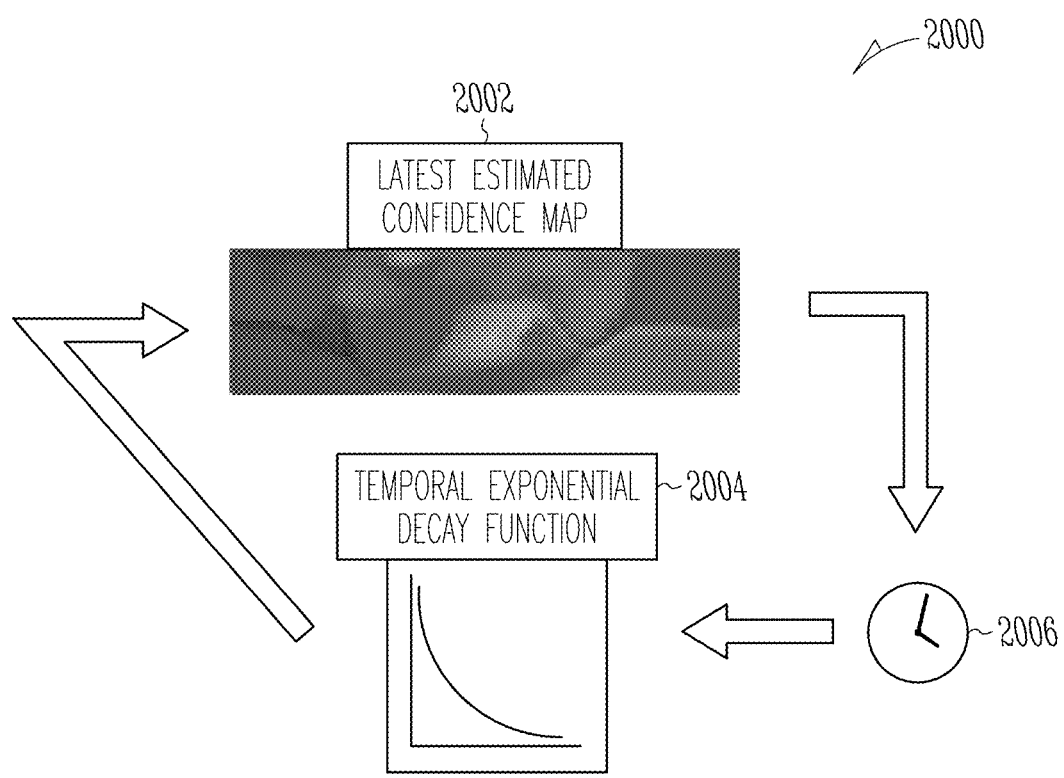
FIG. 20 is an illustrative drawing representing a method to maintain a latest estimated confidence map.

FIG. 20 is an illustrative drawing representing a method 2000 to maintain a latest estimated confidence map 2002. The confidence map 2002 acts as a pixel-wise estimate of the likelihood that the current clarifications at each pixel in the scene estimate still hold true. This confidence map decays over time 2006 between refreshes i.e. fresh incoming frames of scene information to update the map, as indicated by the decay function 2004 to account for low-frequency background changes.

Federated Learning (at the Edge)

Figure 21:
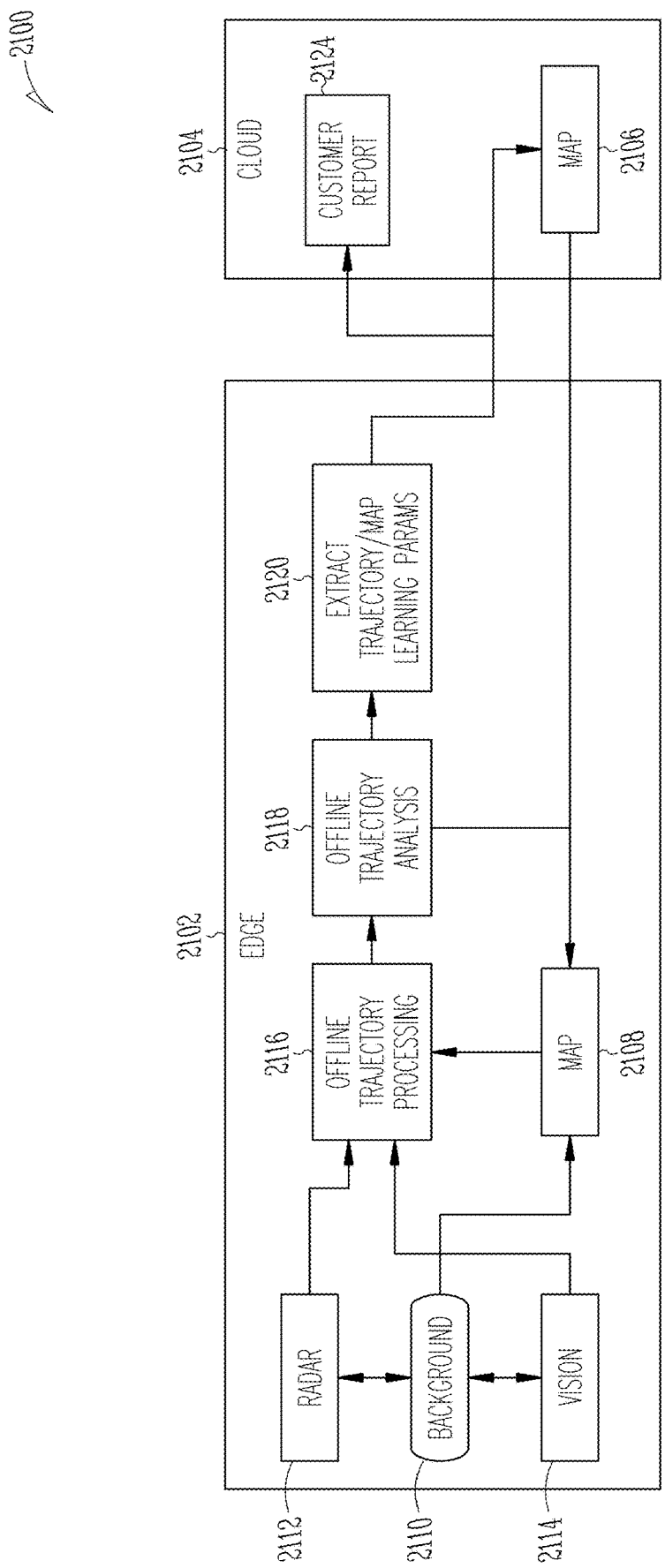
FIG. 21 is an illustrative schematic diagram showing an example spatial sensor computing machine in which background estimate processing is performed at the edge.

FIG. 21 is an illustrative schematic diagram showing an example spatial sensor computing machine 2100 in which background estimate processing is performed at the edge. The computing machine 2100 includes an edge machine 2102 and a cloud machine 2104 coupled to communicate over a network (not shown) such as the Internet. A latest background estimation map 2106 is stored in the cloud machine 2104. The cloud machine periodically downloads a copy 2108 of the latest background estimation map 2106, which contains mask data, to the edge machine 2102.

An edge processing module 2110 accesses the background estimation map copy 2108 at the edge machine 2102. The edge radar sensor 2112 and the edge vision sensor 2104 access the latest background estimation map 2106 to process radar and vision information. The map 2106 can include a trajectory map, background mask or segmentation mask for use to suppress false positives. An offline trajectory processing module 2116 performs trajectory processing at the edge 2102. An offline trajectory analysis module 2118 performs analysis at the edge 2102. An extract trajectory/map learning parameters module 2120 extracts at the edge 2102. The cloud machine 2104 includes a customer report module 21.

Computing Machine

Figure 22:
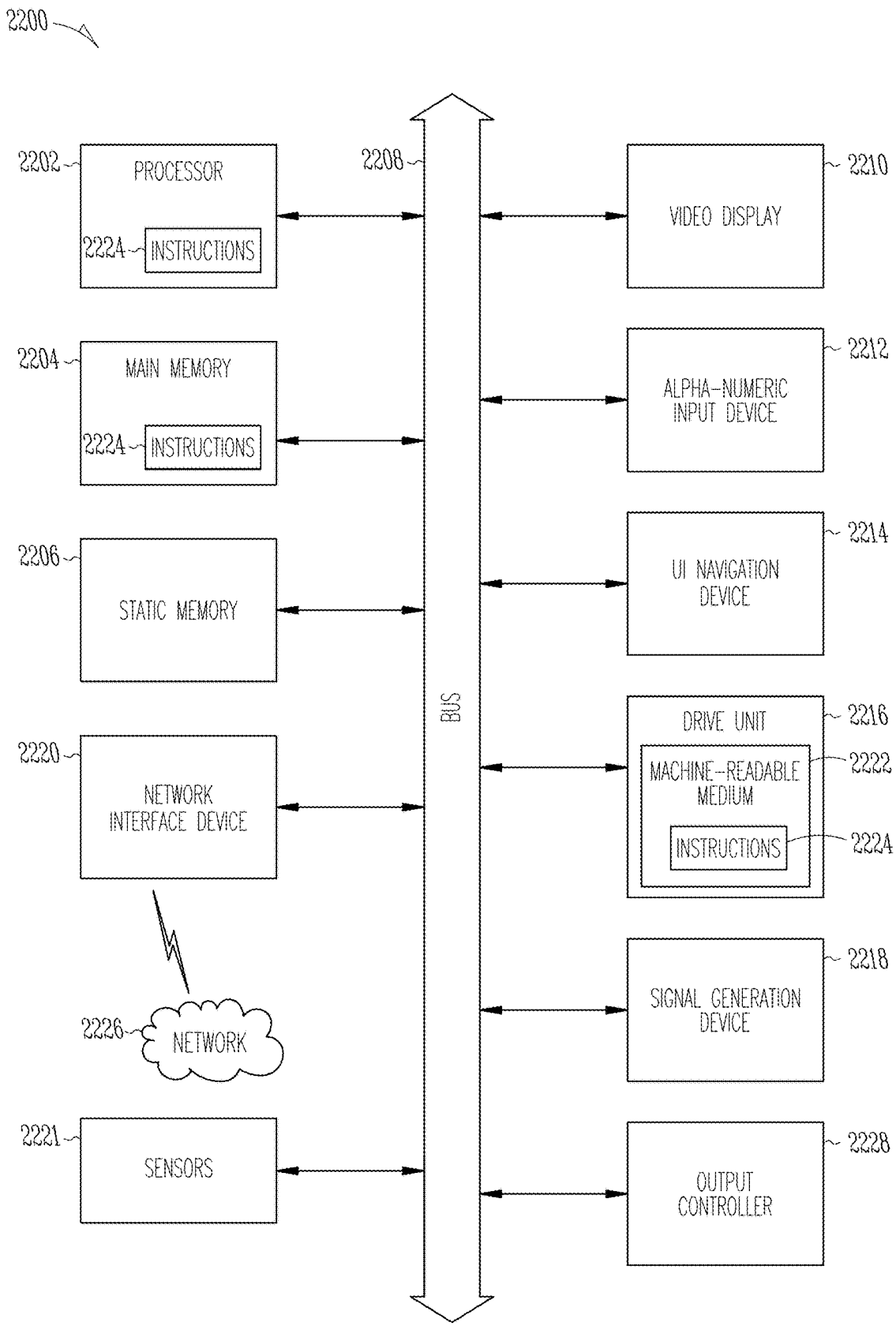
FIG. 22 is an illustrative block diagram of an example computing machine, in accordance with some embodiments.

FIG. 22 is an illustrative block diagram of an example computing machine 2200 in accordance with some embodiments. In some embodiments, the computing machine 2200 may store the components shown in the circuit block diagram of FIG. 22. For example, circuitry that resides in the processor 2202 and may be referred to as "processing circuitry." Processing circuitry may include processing hardware, for example, one or more central processing units (CPUs), one or more graphics processing units (GPUs), and the like. In alternative embodiments, the computing machine 2200 may operate as a standalone device or may be connected (e.g., networked) to other computers. In a networked deployment, the computing machine 2200 may operate in the capacity of a server, a client, or both in server-client network environments. In an example, the computing machine 2200 may act as a peer machine in peer-to-peer (P2P) (or other distributed) network environment. In this document, the phrases P2P, device-to-device (D2D) and sidelink may be used interchangeably. The computing machine 2200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. The radar systems 101 of FIG. 1 and the radar system 1001 and the CVD 1002 of FIG. 10 are implemented using one or more computing machines and storage devices that store instructions that when executed, using the computing machines, cause the computing machines to perform the above-described processes of the radar systems 101, 1001 and the CVD 1002.

Examples, as described herein, may include, or may operate on, logic or a number of components, modules, or mechanisms. Modules and components are tangible entities (e.g., hardware) capable of performing specified operations and may be configured or arranged in a certain manner. A module can include a computing machine 2200 or portions thereof. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processing circuitry configured using software, the general-purpose hardware processing circuitry may be configured through executing instructions stored in a memory device as respective different modules at different times. Software may accordingly configure hardware processing circuitry, for example, to constitute a particular module at one instance of time and to constitute a different module at a different instance of time.

The computing machine 2200 may include hardware processing circuitry 2202 (e.g., a central processing unit (CPU), a GPU, a hardware processor core, or any combination thereof), a main memory 2204 and a static memory 2206, some or all of which may communicate with each other via an interlink (e.g., bus) 2208. Although not shown, the main memory 2204 may contain any or all of removable storage and non-removable storage, volatile memory, or non-volatile memory. The computing machine 2200 may further include a video display unit 2210 (or other display unit), an alphanumeric input device 2222 (e.g., a keyboard), and a user interface (UI) navigation device 2214 (e.g., a mouse). In an example, the display unit 2210, input device 2222 and UI navigation device 2214 may be a touch screen display. The computing machine 2200 may additionally include a storage device (e.g., drive unit) 2216, a signal generation device 2218 (e.g., a speaker), a network interface device 2220, and one or more sensors 2221, such as a global positioning system (GPS) sensor, compass, accelerometer, or other sensor. The computing machine 2200 may include an output controller 2228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 2216 (e.g., a storage device) may include a machine readable medium 2222 on which is stored one or more sets of data structures or instructions 2224 (e.g., software) embodying or utilized by any one or more of the techniques or functions described herein. The instructions 2224 may also reside, completely or at least partially, within the main memory 2204, within static memory 2206, or within the hardware processor 2202 during execution thereof by the computing machine 2200. In an example, one or any combination of the hardware processor 2202, the main memory 2204, the static memory 2206, or the storage device 2216 may constitute machine readable media.

While the machine readable medium 2222 is illustrated as a single medium, the term "machine readable medium" may include a single medium or multiple media (e.g., a centralized or distributed database, and/or associated caches and servers) configured to store the one or more instructions 2224.

The term "machine readable medium" may include any medium that is capable of storing, encoding, or carrying instructions for execution by the computing machine 2200 and that cause the computing machine 2200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 2224 may further be transmitted or received over a communications network 2226 using a transmission medium via the network interface device 2220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2220 may include one or more physical jacks (e.g., Ethernet, coaxial, or phone jacks) or one or more antennas to connect to the communications network 2226.

Machine Learning

Figure 23:
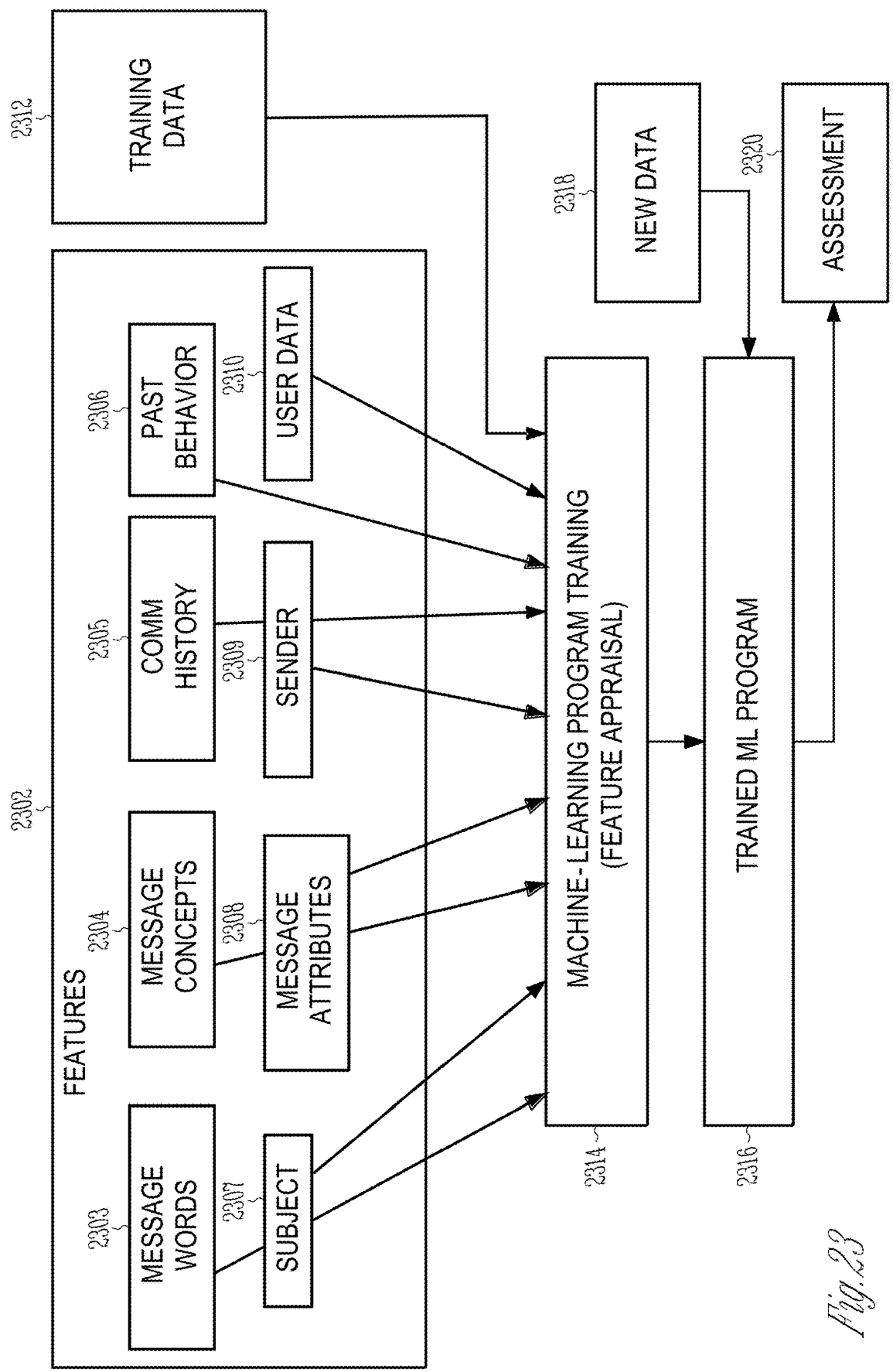
FIG. 23 is an illustrative drawing representing example training and use of an example machine-learning program, according to some example embodiments.

FIGS. 23-26 are illustrative drawings describing machine learning techniques and systems that can be used to train modules 106, 108, 110, 112, 812, 818, 820, 920, 1006, 1008, 1010, 1012, 1018, 1024, 1046, 1306, 1308, 1310, 1314, 1312-1312, 1406-1412, 1506, 1508, 1716, 1718, 1812, 1906, 1914, 1920, 1926, 1928, 1930, 2116, 2118, and 2120, for example, in accordance with some embodiments. One or more computing machines can be specially configured with instructions stored in a memory device, which when executed by the computing machines, cause the computing machines to perform the methods of FIGS. 23-26. FIG. 23 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 2318 in order to make data-driven predictions or decisions expressed as outputs or assessments 2320. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 1818 to find correlations among identified features 2302 that affect the outcome.

The machine-learning algorithms utilize features 2302 for analyzing the data to generate assessments 2320. A feature 2302 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 2302 may be of different types and may include one or more of words of the message 2303, message concepts 2304, communication history 2305, past user behavior 2306, subject of the message 2307, other message attributes 2308, sender 2309, and user data 2380.

The machine-learning algorithms utilize the training data 2323 to find correlations among the identified features 2302 that affect the outcome or assessment 2320. In some example embodiments, the training data 2312 includes labeled data, which is known data for one or more identified features 2302 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 2312 and the identified features 2302, the machine-learning tool is trained at operation 2314. The machine-learning tool appraises the value of the features 2302 as they correlate to the training data 2312. The result of the training is the trained machine-learning program 2316.

When the machine-learning program 2316 is used to perform an assessment, new data 2323 is provided as an input to the trained machine-learning program 2316, and the machine-learning program 2316 generates the assessment 2320 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 24:
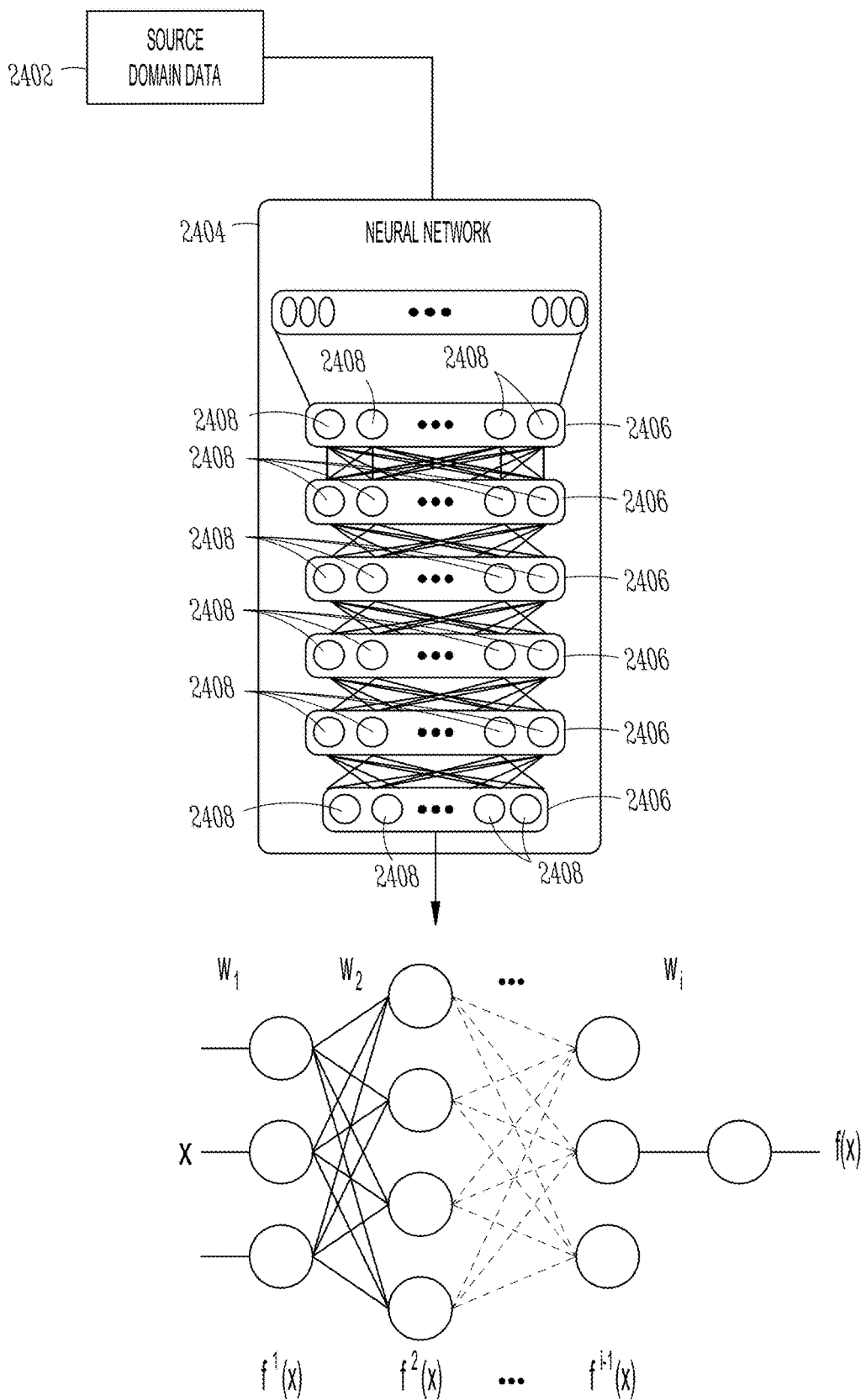
FIG. 24 is an illustrative drawing representing an example neural network, in accordance with some example embodiments.

FIG. 24 illustrates an example neural network 2404, in accordance with some embodiments. As shown, the neural network 2404 receives, as input, source domain data 2402. The input is passed through a plurality of layers 2406 to arrive at an output. Each layer 2406 includes multiple neurons 2408. The neurons 2408 receive input from neurons of a previous layer 2406 and apply weights to the values received from those neurons 2408 in order to generate a neuron output. The neuron outputs from the final layer 2406 are combined to generate the output of the neural network 2404.

As illustrated at the bottom of FIG. 24, the input is a vector x. The input is passed through multiple layers 2406, where weights $W_1, W_2, \ldots, W_i$ are applied to the input to each layer to arrive at $f^1(x), f^2(x), \ldots, f^{i-1}(x)$, until finally the output $f(x)$ is computed.

In some example embodiments, the neural network 2404 (e.g., deep learning, deep convolutional, or recurrent neural network) comprises a series of neurons 2408, such as Long Short Term Memory (LSTM) nodes, arranged into a network. A neuron 2408 is an architectural element used in data processing and artificial intelligence, particularly machine learning, which includes memory that may determine when to "remember" and when to "forget" values held in that memory based on the weights of inputs provided to the given neuron 2408. Each of the neurons 2408 used herein is configured to accept a predefined number of inputs from other neurons 2408 in the neural network 2404 to provide relational and sub-relational outputs for the content of the frames being analyzed. Individual neurons 2408 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

FIG. 25 illustrates the training of an image recognition machine learning program, in accordance with some embodiments. The machine learning program may be implemented at one or more computing machines. As shown, training set 2502 includes multiple classes 2504. Each class 2504 includes multiple images 2506 associated with the class. Each class 2504 may correspond to a type of object in the image 2506 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At module 2508 the machine learning program is trained, for example, using a deep neural network. The trained classifier 2510, generated by the training of module 2508, recognizes an image 2512, and at module 2514 the image is recognized. For example, if the image 312 is a photograph of Bill Clinton, the classifier recognizes the image as corresponding to Bill Clinton at module 314.

A machine learning algorithm is designed for recognizing faces, and a training set 2502 includes data that maps a sample to a class 2504 (e.g., a class includes all the images of purses). The classes may also be referred to as labels or annotations. Although embodiments presented herein are presented with reference to object recognition, the same principles may be applied to train machine-learning programs used for recognizing any type of items.

The training set 2502 includes a plurality of images 2506 for each class 2504 (e.g., image 2506), and each image is associated with one of the categories to be recognized (e.g., a class). The machine learning program is trained at module 2508 with the training data to generate a classifier at module 2510 operable to recognize images. In some example embodiments, the machine learning program is a DNN.

When an input image 2512 is to be recognized, the classifier 2510 analyzes the input image 2512 to identify the class corresponding to the input image 2512. This class is labeled in the recognized image at module 2514.

FIG. 26 illustrates the feature-extraction process and classifier training, according to some example embodiments. Training the classifier may be divided into feature extraction layers 2602 and classifier layer 2614. Each image is analyzed in sequence by a plurality of layers 2606-2613 in the feature-extraction layers 2602.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has often been used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as by reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 2614. In FIG. 26, the data travels from left to right as the features are extracted. The goal of training the neural network is to find the parameters of all the layers that make them adequate for the desired task.

EXAMPLES

Example 1 can include a non-transitory machine-readable medium storing instructions which, when executed by a computing machine, cause the computing machine to perform operations comprising: accessing radar tracks, each radar track comprising one or more Doppler measurements, one or more range measurements, and one or more angle measurements; determining a persistent radar object at a radar background location within the radar scene, based upon one or more of the accessed radar tracks having the background location; and filtering a first accessed first radar track having a location within the radar scene corresponding to the determined background location.

Example 2 can include the subject matter of Example 1 wherein determining the persistent radar object includes: determining that Doppler velocities are less than or equal to a prescribed threshold Doppler velocity, for the one or more accessed radar tracks having the background location; and determining that ranges of motion for the one or more accessed radar tracks having the background location, are less than or equal to a prescribed threshold distance.

Example 3 can include the subject matter of Example 2 wherein the plurality of the accessed radar tracks having the background location are accessed within one or more prescribed measurement time intervals.

Example 4 can include the subject matter of Example 1 wherein determining the persistent radar object includes: determining that Doppler velocities are less than or equal to a prescribed threshold Doppler velocity, for the one or more accessed radar tracks having the background location; and determining that motions, for the one or more accessed radar tracks having the background location, are characteristic of one or more known types of background objects.

Example 5 can include the subject matter of Example 1 wherein filtering the first accessed radar track further includes: adjusting a radar threshold detection parameter for the first accessed radar track having the detected radar background location.

Example 6 can include the subject matter of Example 1 wherein filtering the first accessed radar track further includes: producing background mask information that associates the detected radar background location with a radar scene location; and using the mask information to associate the first accessed radar track having the detected radar background location with an adjusted threshold detection parameter; using the adjusted threshold detection parameter to avoid false detection of the associated first accessed radar track.

Example 7 can include the subject matter of Example 1, the operations further including: detecting track paths for a plurality of radar tracks; determining one or more radar foreground activity patterns, based at least in part upon the detected track paths; and producing an alert signal, based upon at least one second accessed radar track and a determined radar foreground activity pattern.

Example 8 can include the subject matter of Example 1, the operations further including: detecting track paths for a plurality of radar tracks; detecting times of occurrence for the plurality of radar tracks; determining one or more radar foreground activity patterns, based at least in part upon the detected track paths and the detected times of occurrence; and producing an alert signal, based upon at least one second accessed radar track and a determined radar foreground activity pattern.

Example 9 can include the subject matter of Example 1, the operations further including: detecting multiple features of each of a plurality of radar tracks; determining one or more radar foreground activity patterns, based at least in part upon the detected features; and producing an alert signal, based upon at least one second accessed radar track and the determined radar foreground activity pattern.

Example 10 can include the subject matter of Example 9, wherein the multiple features include two or more of, track path, track velocity, track classification, track activity, and track time of occurrence.

Example 11 can include a non-transitory machine-readable medium storing instructions which, when executed by a computing machine, cause the computing machine to perform operations comprising: accessing radar tracks, each radar track comprising one or more Doppler measurements, one or more range measurements, and one or more angle measurements; accessing vision data from one or more computer vision devices, the vision data from the one or more computer vision devices comprising two-dimensional (2D) images of the vision scene; determining a radar background based upon the accessed radar tracks; determining an image background based upon the accessed 2D images; accessing a first accessed radar track at a first radar scene location; accessing a first image region of interest (ROI) at a first vision scene location; filtering the first accessed radar track based at least in part upon whether a first radar scene location of the first accessed radar track is within the radar background and whether a first vision scene location of the first image region of interest (ROI) is within the vision background.

Example 12 can include the subject matter of Example 11, the operations further including: in response to the detecting the first accessed radar track at the first radar scene location and the detecting a first image region of interest (ROI) at the first vision scene location, projecting one of the first radar scene location to the vision scene, whereby the vision scene is a common scene, and the first vision scene location to the radar scene, whereby the radar scene is the common scene; and determining whether the first radar scene location within the common scene matches the first vision scene location within the common scene; in response to determining a match exists, determining whether at least one of the first radar scene location is within a radar background estimation and the first vision scene location is within a vision scene background; and filtering the first accessed radar track in response to a determination that at least one of the first radar scene location is within the radar background estimation and the first vision scene location is within the vision scene background.

Example 13 can include the subject matter of Example 11, the operations further including: determining whether the first accessed radar track is within the radar background; in response to determining that the first accessed radar track is within the radar background, projecting the first radar scene location to a first vision scene location in the vision scene, wherein the first accessed image ROI is at the first vision scene location; determining whether the first vision scene location is within the vision scene background; filtering the first accessed radar track in response to a determination that the first vision scene location is within the vision scene background.

Example 14 can include the subject matter of Example 11, the operations further including: determining whether the first ROI has a location that overlaps image background; in response to detecting overlap with the image background, projecting a vision scene location of the first image ROI to a first radar scene location within the radar scene, wherein the first accessed radar track is at the first radar location; determining whether the first radar scene location is within the radar background; and filtering the first accessed radar track in response to a determination that the first radar scene location is within the radar background.

Example 15 can include the subject matter of Example 11, wherein one of the first radar scene location and the first vision scene location is a ground truth location.

Example 16 can include the subject matter of Example 11, the operations further including: determining geometric three-dimensional (3D) location points in the radar scene based upon a plurality of the accessed radar tracks; determining classifications of image objects within the vision scene, based upon a plurality of the accessed two-dimensional (2D) images; and fusing geometric 3D location points from the radar scene with classified image objects from the vision scene to produce a scene estimate map.

Example 17 can include a non-transitory machine-readable medium storing instructions which, when executed by a computing machine, cause the computing machine to perform operations comprising: accessing data from one or more computer vision devices, the data from the one or more computer vision devices comprising a multiplicity of images of a vision scene; determining a vision background of the vision scene; accessing data from the one or more radar units, the data from the one or more radar units comprising a pair of radar tracks; determining whether motion of the pair of radar tracks is correlated motion; based upon determining that motion of the pair of radar tracks is correlated motion, determining a real track and a ghost track, from among the pair of tracks, based upon the vision background; and determining to filter the determined ghost track.

Example 18 can include the subject matter of Example 17, the operations further including: producing a binary mask based upon the vision background; and using the binary mask to filter the determined ghost track.

Example 19 can include the subject matter of Example 17, further including: the one or more radar units; and the one or more computer vision devices.

Example 20 can include a system comprising: processing circuitry; and a non-transitory memory storing instructions which, when executed by the processing circuitry, cause the processing circuitry to perform operations comprising: accessing data from one or more computer vision devices, the data from the one or more computer vision devices comprising a multiplicity of images of a vision scene; determining a vision background of the vision scene; accessing data from the one or more radar units, the data from the one or more radar units comprising a pair of radar tracks; determining whether motion of the pair of radar tracks is correlated motion; based upon determining that motion of the pair of radar tracks is correlated motion, determining a real track and a ghost track, from among the pair of tracks, based upon the vision background; and determining to filter the determined ghost track.

Example 21 can include a system comprising: a first stationary sensor that includes a geometric measurement sensor to determine geometric three-dimensional (3D) location points in a first sensor scene; a second stationary sensor that includes a computer vision device (CVD) to capture two-dimensional (2D) images within a second sensor scene; processing circuitry; and a non-transitory memory storing instructions which, when executed by the processing circuitry, cause the processing circuitry to perform operations comprising: determining classifications of vision objects within the second scene, based upon the two-dimensional (2D) images within a second sensor scene; and fusing geometric 3D location points from the first scene with classified vision objects from the second scene to produce a scene estimate map.

Example 22 can include the subject matter of Example 21, wherein the first sensor includes a radar sensor.

Example 23 can include the subject matter of Example 21, wherein the first sensor includes a geometric measurement sensor determines ground truth geometric three-dimensional (3D) location points in the first sensor scene.

The invention claimed is:

1. A system comprising:
   processing circuitry; and
   a non-transitory memory storing instructions which, when executed by the processing circuitry, cause the processing circuitry to perform operations comprising:
   accessing radar tracks produced using a radar detection module, each radar track comprising one or more Doppler measurements, one or more range measurements, and one or more angle measurements;
   accessing vision data produced using one or more computer vision devices, the vision data from the one or more computer vision devices comprising two-dimensional (2D) images of a vision scene;
   determining a radar background based upon the radar tracks;
   determining an image background based upon the 2D images;
   accessing a first radar track corresponding to a first radar scene location;
   accessing a first image region of interest (ROI) corresponding to a first vision scene location;
   determining whether the first radar track is within the radar background;
   in response to determining that the first radar track is within the radar background, projecting the first radar scene location to a first vision scene location in the vision scene, wherein the first image ROI is at the first vision scene location;
   determining whether the first vision scene location is within the image background; and
   filtering out at the radar detection module, the first radar track in response to a determination that the first vision scene location is within the image background.

2. The system of claim 1, wherein one of the first radar scene location and the first vision scene location is a ground truth location.

3. The system of claim 1, further including:
   one or more radar units configured to provide radar information to the radar detection module to produce the radar tracks; and
   the one or more computer vision devices.

4. The system of claim 1, wherein determining the image background within the vision scene includes using semantic segmentation to determine an image background estimation.

5. The system of claim 1, wherein the first radar track is filtered out at the radar detection module in response to a determination that the first radar scene location is within a radar background estimation in addition to the first vision scene location is within the image background.

6. The system of claim 5, wherein the instructions, when executed by the processing circuitry, cause the processing circuitry to perform further operations comprising:
   in response to determining the first radar track at the first radar scene location and the first image ROI at the first vision scene location, projecting at least one of the first radar scene location and the first vision scene location to a common scene;
   determining whether the first radar scene location within the common scene matches the first vision scene location within the common scene; and
   in response to determining a match exists, determining whether at least one of the first radar scene location is within the radar background estimation and the first vision scene location is within the image background.

7. The system of claim 1, wherein the instructions, when executed by the processing circuitry, cause the processing circuitry to perform further operations comprising:
   determining whether the first image ROI has a location that overlaps the image background; and
   in response to determining the first image ROI has the location that overlaps with the image background, projecting the first vision scene location of the first image ROI to the first radar scene location.

8. The system of claim 1, wherein the radar tracks are produced during a measurement time interval that is long enough to determine within a prescribed confidence level whether an object is a background object having a persistent distribution of locations within a radar scene.

9. The system of claim 1, wherein the instructions, when executed by the processing circuitry, cause the processing circuitry to perform further operations comprising determining that an object is a background object having a persistent distribution of locations within a radar scene by determining that the object moves with a motion that is characteristic of one or more known types of background objects.

10. The system of claim 1, wherein the instructions, when executed by the processing circuitry, cause the processing circuitry to perform further operations comprising:
  determining that an object is a background object having a persistent distribution of locations within a radar scene; and
  filtering out, at the radar detection module, detection of radar data that corresponds to the persistent distribution of locations by adjusting a radar threshold detection parameter for a portion of the radar data that corresponds to the persistent distribution of locations of the background object within the radar scene, the radar threshold detection parameter comprising a peak signal-to-noise ratio (PSNR).

11. The system of claim 1, wherein the instructions, when executed by the processing circuitry, cause the processing circuitry to perform further operations comprising:
  determining that an object is a background object having a persistent distribution of locations within a radar scene;
  producing background mask information that associates the persistent distribution of locations with an adjusted threshold detection parameter, the adjusted threshold detection parameter comprising a peak signal-to-noise ratio (PSNR); and
  filtering out, at the radar detection module, detection of radar data that corresponds to the persistent distribution of locations by:
    using the background mask information to associate a portion of the radar data that corresponds to the persistent distribution of locations with the adjusted threshold detection parameter; and
    using the adjusted threshold detection parameter to avoid false detection of the portion of the radar data that corresponds to the persistent distribution of locations.

12. A system comprising:
  a cloud-based computing machine that includes first processing circuitry and includes an edge-based computing machine that includes second processing circuitry, the cloud-based computing machine and the edge-based computing machine communicatively coupled over a network;
  a first non-transitory memory storing instructions which, when executed by the first processing circuitry, cause the first processing circuitry to perform operations comprising:
    accessing radar tracks produced using a radar detection module, each radar track comprising one or more Doppler measurements, one or more range measurements, and one or more angle measurements;
    accessing vision data produced using one or more computer vision devices, the vision data from the one or more computer vision devices comprising two-dimensional (2D) images of a vision scene;
    determining a radar background based upon the radar tracks;
    determining an image background based upon the 2D images;
    accessing a first radar track corresponding to a first radar scene location;
    accessing a first image region of interest (ROI) corresponding to a first vision scene location;
    determining whether the first radar track is within the radar background;
    in response to determining that the first radar track is within the radar background, projecting the first radar scene location to a first vision scene location in the vision scene, wherein the first image ROI is at the first vision scene location; and
    determining whether the first vision scene location is within the image background; and
  a second non-transitory memory storing instructions which, when executed by the second processing circuitry, cause the first processing circuitry to perform operations comprising:
    filtering out at the radar detection module, the first radar track in response to a determination that the first vision scene location is within the image background.

* * * * *